US006529220B1

(12) United States Patent
Matsumoto

(10) Patent No.: US 6,529,220 B1
(45) Date of Patent: Mar. 4, 2003

(54) METHOD AND APPARATUS FOR FORMING IMAGE WITH IMAGE RECORDING LIQUID AND DUMMY LIQUID

(75) Inventor: Nobuo Matsumoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 101 days.

(21) Appl. No.: 09/656,219

(22) Filed: Sep. 6, 2000

(30) Foreign Application Priority Data

Sep. 6, 1999 (JP) .......................................... 11-251392
Sep. 7, 1999 (JP) .......................................... 11-253144

(51) Int. Cl.[7] ............................ G01D 15/16; B41J 2/01; B41J 3/407

(52) U.S. Cl. .................... 346/140.1; 347/101; 347/104; 347/106

(58) Field of Search .............................. 347/21, 14, 19, 347/101–106, 23, 10, 12; 346/140.1; 358/127, 296

(56) References Cited

U.S. PATENT DOCUMENTS 4,109,282 A 8/1978 Robertson et al. .......... 358/127
5,004,628 A 4/1991 Terai et al. .............. 427/389.9
6,450,611 B1 * 9/2002 Brown, Jr. et al. ........... 347/37

FOREIGN PATENT DOCUMENTS

JP 63-291663 11/1988 ............. B05C/5/00

* cited by examiner

*Primary Examiner*—Hai Pham
*Assistant Examiner*—Charles W. Stewart, Jr.
(74) *Attorney, Agent, or Firm*—Sughrue Mion, PLLC

(57) ABSTRACT

An image recording liquid obtained by changing a mixing proportion of a plurality of recording liquids based on an image signal is transferred as a continuous flow to an image receiving medium to form an image thereon. To the image receiving medium, the image recording liquid is transferred in an image forming width, and a dummy liquid for forming substantially no image is transferred to the outside of the image forming width. Both edges of the image recording area are prevented from being raised or thickened on the image receiving medium or from spreading over in the width direction. The image density is prevented from increasing or decreasing on the edge of the image, the stream line of the image recording liquid can be prevented from being distorted, and the image quality can be enhanced. In another mode, the dummy liquid continues to a fore end and/or a rear end of the image forming area and is transferred to the image receiving medium.

60 Claims, 18 Drawing Sheets

METHOD AND APPARATUS FOR FORMING IMAGE WITH IMAGE RECORDING LIQUID AND DUMMY LIQUID

BACKGROUND OF THE INVENTION

1. Field of the Invention

The present invention relates to an image forming method and apparatus for generating an image recording liquid having a predetermined density and/or a predetermined color by changing a mixing proportion of plural coating liquids based on an image signal, and leading the image recording liquid as a continuous flow to an image receiving medium to form an image.

2. Description of Related Art

U.S. Pat. No. 4,109,282 discloses a printing device, in which a valve called a flap valve is disposed in a flow path for leading two types of liquid, that is, clear ink and black ink into an image forming substrate. The flow path for each ink is opened/closed by displacing this valve so that the two types of liquid are mixed by a kept/fixed total amount in a desired density to be transferred onto the substrate. This enables printout of an image having gray scale information which is the same as that of the image information displayed on a TV screen.

This patent discloses that a voltage is applied between the flap valve and an electrode provided on an surface opposite to the flap valve and the valve itself is mechanically deformed by an electrostatic attracting force to displace the valve. Furthermore, the ink is absorbed in paper by a capillary action which acts on the ink between a tip end of the flap valve and fibers of a print paper.

Unexamined Japanese Patent Publication (KOKAI) No. 291663/1988 discloses a coating method, in which two types of thick (dark) and thin (light) liquid are mixed in a coating head to be continuously extruded from a slot-opening opposed to a running web. Thus, the mixed liquid is consecutively coated on the web. In this coating method, the mixed liquid is coated over the entire coating width with a uniform coating membrane pressure without forming residue deposit, and the coating liquid having a density graduation in time course is, continuously applied with respect to a traveling direction of the web. In addition, this method enables coating with a uniform thickness with respect to the width direction.

According to the method disclosed in the U.S. Pat. No. 4,109,282, the ink extruded from the nozzle is directly applied on the paper. Therefore, when the paper has a large thickness or irregularity on a surface, it is difficult to reproduce an image on the paper with fidelity with respect to the electric signal. Accordingly, this method has not been practically used yet. Further, since the ink to be used is restricted to two types, a color image cannot be recorded.

Furthermore, since the ink is drawn out by the capillary action between the ink and the fibers of the paper in this mode, the ink tends to be affected by paper quality and a change in the paper quality involves a change in an image quality. Moreover, the image cannot be truly reproduced due to the partial irregularity of the fiber structure even if the paper with the same quality is used.

According to the method disclosed in the Unexamined Japanese Patent Publication (KOKAI) No. 291663/1988, although the image having the density graduation along the traveling direction of the web which is a coating target can be formed, the image cannot have a density graduation along a width direction of the web (a direction perpendicular to the traveling direction). Consequently, application of the coating liquid whose color or density changes for each pixel in accordance with an image signal is impossible.

Therefore, the present applicant has proposed an image forming method (continuous coating method) of changing a mixing proportion of a plurality of coating liquids based on an image signal to extrude a continuous flow from a plurality of coating liquid extruding ports, and continuously coating an image receiving medium with the continuous flow of the image recording liquid (Japanese Patent Application No. 374662/1998;

U.S. patent application Ser. No. 09/472,977). Moreover, when the image receiving medium is continuously coated with the image recording liquid, distortion of a stream line of image recording liquid occurs in a bead formed on an upstream side of a coating portion, and the image quality is deteriorated. In order to prevent this stream line distortion, the present applicant has also proposed a method of applying a clear undercoating liquid between the image recording liquid and the image receiving medium (Japanese Patent Application No. 374663/1998; U.S. patent application Ser. No. 09/472,974).

However, in these continuous coating methods, on both edges of an image forming width the image recording liquid is raised and thickened, or spread over and thinned in a width direction. Therefore, an image density rises or decreases particularly in the vicinity of both edges of the image forming width and an image quality is deteriorated by the, distorted stream line of the image recording liquid.

Moreover, in these continuous coating methods, in a front edge (edge of the image receiving medium in a moving direction) or a rear edge (edge in a direction reverse to the moving direction) of an image forming area, the image recording liquid becomes thick as compared with a central portion of the image forming area, or is spread on the front edge or the rear edge and thinned. Moreover, a position of the image recording liquid may change. Therefore, the thickness of the image recording liquid is distorted particularly in the vicinity of the front edge or the rear edge of the image forming area, resulting in that no desired image quality or density can be obtained.

SUMMARY OF THE INVENTION

The present invention has been accomplished under the aforementioned circumstances, and a first object thereof is to provide an image forming method by which a thickness or a stream line of an image recording liquid can be prevented from being distorted in the vicinity of both edges of an image forming width in a continuous coating method, and a stable and good-quality image can be formed. A second object is to provide an image forming apparatus for direct use in implementing the method.

Moreover, a third object of the present invention is to provide an image forming method by which a thickness or a position of an image recording liquid can be prevented from changing in the vicinity of a front edge and/or a rear edge of an image forming area in a continuous coating method, and a stable and good-quality image can be formed. A fourth object is to provide an image forming apparatus for direct use in implementing the method.

According to the present invention the first object is attained by an image forming method for forming an image on an image receiving medium with an image recording liquid, comprising steps of:

a) combining a plurality of recording liquids to form said image recording liquid, a mixing ratio of the plurality of recording liquids being varied based on an image signal;

b) extruding said image recording liquid from an image recording liquid extruding port to the image receiving medium as a continuous flow while the image receiving medium is moved relatively to the extruding port, so that said image recording liquid is continuously transferred to the image receiving medium to form the image; and c) extruding a dummy liquid for forming no image from a dummy liquid extruding port to the image receiving medium;

wherein to said image receiving medium, the image recording liquid is transferred in an image forming width, and a dummy liquid for forming no image is transferred to the outside of said image forming width.

In the present invention, the dummy liquid for forming substantially no image is applied outside the image forming width. This prevents both edges of the image recording liquid from being raised and thickened on the image receiving medium or being spread out in a width direction, prevents an image density from rising or lowering in the edge of the image and can prevent a stream line of the image recording liquid from being distorted. Therefore, an image quality can be enhanced.

The image recording liquid within the image forming width and the dummy liquid outside the image forming width may deviate in time from each other during transferring. However it is preferably to combine the both liquids in a direction perpendicular or substantially orthogonal to the relative moving direction of the image receiving medium and simultaneously transfer the liquids as a zonal continuous flow. It is desirable to set at least one of a surface tension and a viscosity of the image recording liquid and the dummy liquid in the vicinity of a contact portion of both liquids to be substantially the same, and to smoothly continue a boundary of the liquids. By setting both liquids substantially the same temperature at least when both liquids come into contact with each other, the boundary of the liquids can further be smoothed, and the distortion can be reduced.

A plurality of dummy liquid extruding ports may be disposed on at least one outer side of the image forming width, and an extruding width of the dummy liquid can be changed and appropriately set. The extruding width of the dummy liquid is set to a width for one or more pixels, and may be increased in accordance with an ink coating thickness. Usually, the width is preferably several tens of micrometers. In this case, by changing the dummy liquid extrusion amount from each dummy liquid extruding port, the thickness of the dummy liquid on the image receiving medium can be uneven in the width direction For example, by setting a volume flow rate per unit width of the dummy liquid not to exceed the volume flow rate per unit width of the image recording liquid, or gradually reducing the thickness of the dummy liquid on the image receiving medium toward the outside of the width direction, the dummy liquid can further be stabilized on the image receiving medium. This can further securely prevent the image quality from being distorted.

When the image recording liquid extruding port can also be used as (diverted to) the dummy liquid extruding port, even a change of the image forming width can easily be handled without replacing a recording head. The dummy liquid is preferably a clear liquid (image non-forming liquid) containing substantially no image forming substance. Moreover, when at least one of the plurality of recording liquids constituting the image recording liquid is substantially used as the image non-forming liquid for forming substantially no image after image formation, the density can be adjusted by changing a mixing proportion of the image non-forming liquid and another recording liquid. The dummy liquid can be the same as at least some image non-forming liquids among the recording liquids which form the image recording liquid. In this case, types of liquids for use can be reduced. Moreover, by keeping the volume flow rate of the image recording liquid extruded from the image recording liquid extruding port to be substantially constant, transferring of the image recording liquid to the image receiving medium from the recording head can be stabilized, which is suitable for image quality enhancement.

The second object of the present invention is attained by an image forming apparatus for forming an image on an image receiving medium with an image recording liquid, comprising:

a recording head having an array of plural image recording liquid extruding ports and a dummy liquid extruding port, the array of the plural image recording liquid extruding ports being aligned in a direction perpendicular to a relative moving direction of the image receiving medium within an image forming width, the respective image recording liquid extruding ports extruding plural recording liquids and combining the plural recording liquids to form said image recording liquid, the image recording liquid being transferred to the image receiving medium as a continuous flow while the image receiving medium is moved relatively to the aligned plural image recording liquid extruding ports, the dummy liquid extruding port being disposed adjacent to the outside of the image forming width and extruding a dummy liquid;

image recording liquid extrusion amount control means for controlling supply amounts of the recording liquids fed to said respective image recording liquid extruding ports;

dummy liquid extrusion amount control means for controlling an extrusion amount of the dummy liquid extruded from the dummy liquid extruding port; and a controller for controlling said image recording liquid extrusion amount control means and said dummy liquid extrusion amount control means;

wherein said controller determines a mixing proportion of the plural recording liquids in the image recording liquid based on an image signal, and determines a supply amount and a supply timing-of the respective recording liquids and the determined the supply amount and supply timing is fed to said image recording liquid extrusion amount control means;

wherein said controller determines a supply amount and supply timing of the dummy liquid extruded from the dummy liquid extruding port and the determined supply amount and supply timing of the dummy liquid is fed to said dummy liquid extrusion amount control means.

The controller determines the mixing proportion of the coating liquids to be led to the respective image recording liquid extruding ports based on the image signal, and controls color and/or density of a mixture liquid. A plurality of recording liquids to form the mixture liquid (image recording liquid) are extruded as a continuous flow from the image recording liquid extruding port within the image forming width, and transferred to the image receiving medium together with the dummy liquid extruded from the dummy liquid extruding port outside the image forming width. As a result, the image is formed on the image receiving medium.

Since the image recording liquid is transferred as the continuous flow with both edges held by the dummy liquid, the image recording liquid fails to be spread over in the width direction, and a high-quality image can be formed.

When a plurality of dummy liquid extruding ports are disposed on at least one outer side of the image forming width, adjustment of dummy liquid extrusion amount or extrusion width of the dummy liquid can easily be performed. By continuously arranging the image recording liquid extruding ports and dummy liquid extruding port in the width direction of the recording head, the image recording liquid and dummy liquid can simultaneously be transferred to the image receiving medium. When the dummy liquid can also be used as (can mutually be diverted to) the image recording liquid extruding port, the change of the image forming width can easily be handled.

In the recording head, a slot-shaped opening may be provided for connecting the image recording liquid extruding port to the dummy liquid extruding port in the width direction and combining the image recording liquid and dummy liquid in the width direction to extrude the integrated liquids in a strip shape. In this case, the image recording liquid can further steadily be transferred to the image receiving medium together with the dummy liquid. The recording head may be provided with a slot-shaped opening for extruding and applying an undercoating liquid. By applying the undercoating liquid from the slot-shaped opening, and transferring the image recording liquid and dummy liquid onto the undercoating liquid in a superposed manner, the stream line of the image recording liquid is prevented from being distorted and the image quality can further be enhanced.

The image receiving medium may be an intermediate image receiving medium to which the recording liquid extruded from the image recording liquid extruding port is transferred. The image recording liquid temporarily held on the intermediate image receiving medium is transferred to a final image receiving medium such as a recording sheet. In this case, the undercoating liquid can be used as a layer in contact with the surface of the intermediate image receiving medium to cover the surface of a final image when transferred to the final image receiving medium.

The extrusion amount control means can be formed by a control valve disposed on a passage extending from a feed path for supplying the recording liquid to the recording liquid extruding port. For example, the means may be formed by a diaphragm valve using a piezoelectric element. This extrusion amount control valve is disposed for each of pixels arranged in the width direction of the recording head, and the flow rate is controlled by either one of a valve opening degree, opening time, and opening frequency, or a combination of these. Moreover, the extrusion amount control means may be formed by a pump with a variable extrusion amount. This pump may be constituted, for example, of the piezoelectric element disposed for each of the pixels arranged in the width direction of the recording head, and a check valve. In this case, the flow rate is controlled by either one of an operation speed, operation time, and operation frequency of the pump, or a combination of these.

The coating liquids, i.e., image recording liquid and dummy liquid, can be transferred from the recording head to the image receiving medium by various kinds of modes. For example, it is possible to adopt a slot coating method by which the coating liquid extruding ports is formed on the top surface, the bottom surface or the side surface of the recording head and the image receiving medium is moved along the surface having the extruding ports with maintaining a predetermined gap from the surface. The coating liquids are extruded and guided to the gap between the surface of the recording head and the image receiving medium to form an image.

Additionally, it is possible to use a slide coating method by which a sloped surface which inclines toward the image receiving medium is formed on the top surface of the recording head and the coating liquids extruded on the sloped surface flow down to form a bead at the lower end of the sloped surface where the coating liquids meet the image receiving medium which is moving thereby, so that an image is formed or recorded on the image receiving medium. Moreover, a curtain coating method may be adopted, in which the coating liquids supplied from the recording head flow down along a guide plate onto the image receiving medium.

Although the image receiving medium itself may be a final image receiving medium such as print paper, it may be an intermediate image receiving medium. In this case, the intermediate image receiving medium is provided between the recording head and the final image receiving medium and transfer the coating liquids fed from the recording head to the final image receiving medium, and it may have a drum-like shape or an endless belt-like shape.

The third object of the present invention is attained by an image forming method for forming an image on an image receiving medium with an image recording liquid, comprising steps of:

a) combining a plurality of recording liquids to form said image recording liquid, a mixing ratio of the plurality of recording liquids being varied based on an image signal;

b) extruding said image recording liquid from an image recording liquid extruding port to the image receiving medium as a continuous flow while the image receiving medium is moved relatively to the extruding port, so that said image recording liquid is continuously transferred to the image receiving medium to form the image; and c) extruding a dummy liquid for forming no image from a dummy liquid extruding port to the image receiving medium;

wherein said dummy liquid is transferred to said image receiving medium so that the transferred dummy liquid adjoins at least one of a front end and a rear end of an image forming area to which the image recording liquid is transferred.

In this mode of the present invention, the dummy liquid for forming substantially no image is transferred to the fore end and/or the rear end of the image forming area. This prevents the front edge and/or the rear edge of the image recording liquid from spreading onto the image receiving medium, and can prevent the image from being distorted on the front/rear edge of the image. Therefore, the image quality can be enhanced.

In order to transfer the dummy liquid to the front-end side of the image forming area, the dummy liquid may be transferred to the image receiving medium after the extruding from the dummy liquid extruding port is stabilized.

Judgment on whether or not the extruding from the dummy liquid extruding port is stabilized can be performed by an output of a bubble detection sensor disposed in the vicinity of a dummy liquid extruding port. Specifically, when the dummy liquid contains a bubble, the extruding becomes unstable.

The bubble detection sensor can radiate laser light to the surface (hereinafter referred to as an extrusion surface) of the dummy liquid extruded from the dummy liquid extruding port, and monitor the laser light reflected by the dummy liquid surface (extrusion surface). This constitution can be formed by a laser light source, a scanning optical system for scanning the laser light to the dummy liquid extrusion surface, and a light receiving element for receiving the reflected light.

In order to prevent the dummy liquid from being transferred to the image receiving medium before the extruding of the dummy liquid is stabilized, the recording head may be disposed apart from the image receiving medium. Additionally or alternatively, a liquid recovery section is disposed midway in a transfer path of the dummy liquid to the image receiving medium from the dummy liquid extruding port, and the unstably extruded and unnecessary dummy liquid is removed and recovered before reaching the image receiving medium.

In order to transfer the dummy liquid to the rear end of the image forming area, the transferring to the image receiving medium may be ended before the extruding of the dummy liquid is stopped, in other words, before the extruding becomes unstable. By regulating the transferring of the dummy liquid to the image receiving medium while the extruding of the dummy liquid is stable, the unstably extruded dummy liquid is prevented from being applied to the image receiving medium, which is suitable for the image quality enhancement. In order to prevent the unstable dummy liquid from being transferred to the image receiving medium, the recording head is detached from the image receiving medium while the dummy liquid is stable. Additionally or alternatively, the liquid recovery section may be disposed midway in the transfer path of the dummy liquid to the image receiving medium from the dummy liquid extruding port. While the extruding of the dummy liquid to be transferred to the rear end of the image forming portion is stable, the liquid recovery section starts operating to prevent the dummy liquid from being transferred to the image receiving medium.

In addition to the front end or the rear end of the image forming area, the dummy liquid may be transferred to at least one outer side of the width direction. This not only prevents the image from being distorted on the front-end side or the rear end of the image forming area, but also prevents the image from being distorted in the edge of the width direction of the image forming area.

The image recording liquid transferred within the image forming area and the dummy liquid transferred to the front end or the rear end of the image forming area or to the outside of the width direction may deviate from each other in time and be applied. Preferably, the liquids are combined as a strip-shaped continuous flow in a direction substantially perpendicular to the relative moving direction of the image receiving medium and successively transferred continuously in time. For the image recording liquid and dummy liquid, by setting at least one of surface tension and viscosity to be substantially the same in the vicinity of the contact portion of both liquids, the boundary of both liquids may preferably smoothly be continued. By setting the same temperature at least when both liquids come in contact with each other, the boundary of both liquids can further be smoothed, and the distortion can be reduced.

By arranging a multiplicity of dummy liquid extruding ports in the direction completely or substantially crossing at right angles to the relative moving direction of the image receiving medium, the transfer width of the dummy liquid may appropriately be set in accordance with the image forming width. In this case, by changing the dummy liquid extrusion amount from each dummy liquid extruding port, the coating thickness of the dummy liquid can be uneven in a length direction of the image forming area, that is, in the relative moving direction of the image receiving medium. For example, by setting the volume flow rate per unit transfer length of the dummy liquid not to exceed the volume flow rate per unit transfer length of the image recording liquid, or gradually reducing the transfer thickness of the dummy liquid toward the front or the rear of the image forming area, a dummy liquid transfer portion can further be stabilized, and the image quality on the front or rear edge of the image forming area can further be improved.

When the image recording liquid extruding port can also be used as (diverted to) the dummy liquid extruding port, even the change of the image forming width can easily be handled without replacing the recording head. The dummy liquid is preferably a clear liquid (image non-forming liquid) containing substantially no image forming substance. Moreover, when at least one of the plurality of recording liquids constituting the image recording liquid is substantially used as the image non-forming liquid for forming substantially no image after image formation, the density can be adjusted by changing the mixing proportion of the image non-forming liquid and another recording liquid. The dummy liquid can also be the same as at least some image non-forming liquids which form the image recording liquid. In this cases the types of liquids for use can be reduced. Moreover, by keeping the volume flow rate of the image recording liquid extruded from the image recording liquid extruding port to be substantially constant, the transferring of the image recording liquid to the image receiving medium from the recording head can be stabilized, which is suitable for the image quality enhancement The fourth object of the present invention is attained by an image forming apparatus for forming an image with an image recording liquid comprising:

- a recording head having an array of plural image recording liquid extruding ports and a dummy liquid extruding port, the array of the plural image recording liquid extruding ports being aligned in a direction perpendicular to a relative movement direction of the image receiving medium within an image forming width, the respective image recording liquid extruding ports extruding plural recording liquids and combining the plural recording liquids to form said image recording liquid, the image recording liquid being transferred to the image receiving medium as a continuous flow while the image receiving medium is moved relatively to the aligned plural image recording liquid extruding ports, the dummy liquid extruding port being disposed to cover the image forming width and extruding a dummy liquid to;
- image recording liquid extrusion amount control means for controlling supply amounts of the recording liquids fed to said respective image recording liquid extruding port;
- dummy liquid extrusion amount control means for controlling an extrusion amount of the dummy liquid extruded from the dummy liquid extruding port; and
- a controller for controlling said image recording liquid extrusion amount control means and said dummy liquid extrusion amount control means;
- wherein said controller determines a mixing proportion of the plural recording liquids in the image recording liquid based on an image signal, and determines a supply amount and a supply timing of the respective recording liquids and the determined supply amount and supply timing is fed to said image recording liquid extrusion amount control means;

wherein said controller determines a supply amount and supply timing of the dummy liquid extruded from the dummy liquid extruding port and the determined supply amount and supply timing of the dummy liquid is fed to said dummy liquid extrusion amount control means, so that the dummy liquid is transferred to at least one of a front end and a rear and of an image forming area to which the image recording is transferred.

By individually arranging the image recording liquid extruding ports and the dummy liquid extruding port continuously in the width direction of the recording head, the image recording liquid and dummy liquid can successively be transferred to the image receiving medium in a time deviating manner. When the dummy liquid and image recording liquid extruding ports can be used in a combined manner (can be diverted to each other), the dummy liquid can be transferred not only to the front end or the rear end of the image forming area but also to the outside of the width direction, and even the change of the image forming width can easily be handled.

When the image recording liquid extruding port and dummy liquid extruding port are used in the combined manner, and when the dummy liquid can also be transferred to the outside of the width direction of the image forming area, the recording head may be provided with a slot-shaped opening for connecting the image recording liquid extruding port to the dummy liquid extruding port in the width direction and for combining the image recording liquid and dummy liquid in the width direction to extrude the liquids in the strip shape. In this case, the image recording liquid can further steadily be transferred to the image receiving medium together with the dummy liquid. The recording head may be provided with a slot-shaped opening for extruding and applying an undercoating liquid. By transferring the undercoating liquid from the slot-shaped opening, and transferring the image recording liquid and dummy liquid onto the undercoating liquid in the superposed manner, the thickness or position of the image recording liquid is prevented from being distorted and the image quality can further be enhanced.

The image receiving medium may be sheet shaped such as paper or film shaped, so that the image recording liquid and the dummy liquid may be transferred to the image receiving medium directly by the recording head. Alternatively, the image recording liquid may be transferred to the final image receiving medium such as paper via the intermediate image receiving medium such as a transfer drum. In this case, by performing a surface treatment to stabilize a surface state of the intermediate image receiving medium, an influence of fluctuation of the surface state of the final image receiving medium is prevented from being easily exerted, and a high-quality image can further be formed. Moreover, the liquid recovery section can be disposed in the intermediate image receiving medium.

When the image is transferred to the final image receiving medium via the intermediate image receiving medium, the liquid recovery section may be disposed in the intermediate image receiving medium. The liquid recovery section may be formed by a blade which can be attached to or detached from the surface of the intermediate image receiving medium. Specifically, by pressing the blade onto the surface of the intermediate image receiving medium, the liquid transferred to the surface of the intermediate image receiving medium is removed and recovered, and is prevented from being transferred to the final image receiving medium.

The controller transfers the dummy liquid prior to the image forming liquid, and transfers the image recording liquid continuously after the dummy liquid. In order to transfer the image recording liquid, the controller determines the mixing proportion of a plurality of recording liquids to be led to is the respective image recording liquid extruding ports based on the image signal, and controls the color or density of the mixture liquid. A plurality of recording liquids forming the mixture liquid (image recording liquid) are extruded as the continuous flow from the image recording liquid extruding port within the image forming width.

When the image recording liquid is extruded, the dummy liquid may simultaneously be extruded from the dummy liquid extruding port outside the image forming width. In this case, the dummy liquid is transferred to the image receiving medium together with the image recording liquid. As a result, the image is formed on the image receiving medium. Since the image recording liquid is transferred with the front edge and/or the rear edge held by the dummy liquid, the thickness or position of the front edge and/or the rear edge of the image recording liquid is stabilized, and the high-quality image can be formed. When the dummy liquid is also transferred to the outside of the image forming width, the image quality of the edge of the width direction of the image fails to be distorted, and the image quality is further enhanced.

In the present invention, the image formed on the image receiving medium includes graphical intelligence patterns such as alphanumeric characters, graphical display, line art, and other image information.

DETAILED DESCRIPTION OF THE PREFERRED EMBODIMENTS

First Embodiment

One embodiment of a slot coating method according to the present invention will be described with reference to FIGS. 1 to 8.

Figure 1:
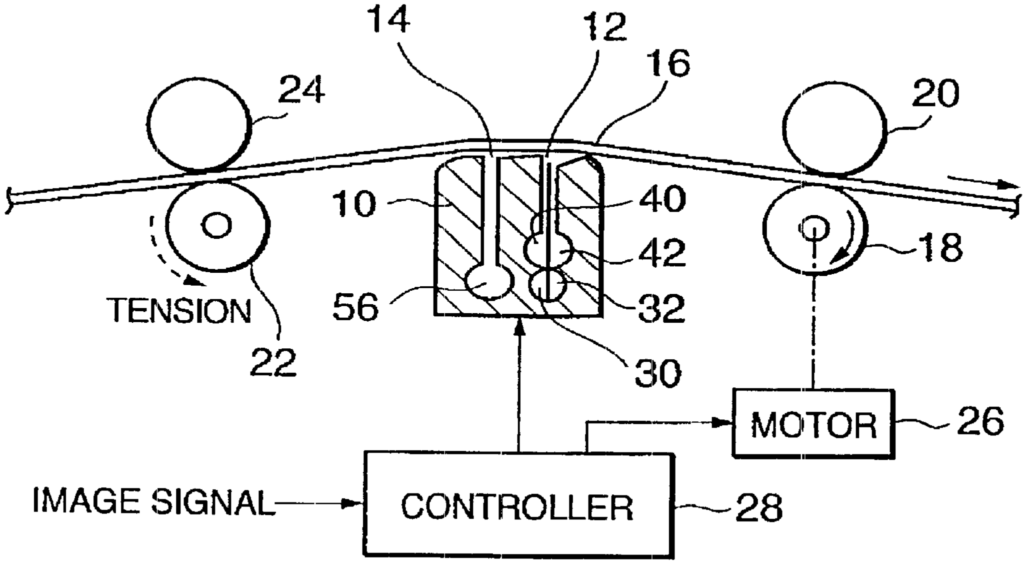
FIG. 1 is a schematic diagram of an image forming apparatus (coating apparatus) according to a first embodiment of the present invention to which a slot coating method is applied.

In FIG. 1, reference numeral 10 designates a recording head, and this recording head 10 has multiple extruding ports 12 for extruding plural coating liquids and one slot-shaped opening 14 formed on the upper surface thereof. An image receiving medium 16 constituted by a recording sheet runs to one direction (the right-hand side) on the upper surface of the recording head 10 while the sheet 16 is pushed up by the recording head 10 with a fixed pressure. The coating liquid extruding ports 12 includes image recording liquid extruding ports 12A and a dummy liquid extruding port(s) 12B described hereinafter, and these are herein generically referred to as the coating liquid extruding ports 12.

Reference numeral 18 denotes a driving roller for sandwiching the recording sheet 16 with a driven roller 20 so that the recording sheet 16 is fed to one direction (the right-hand side). 22 is a tension roller which is positioned on the side opposed to the driving roller 18 and the driven roller 20 with the recording head 10 therebetween. The tension roller 22 imparts a fixed tensile force (tension) to the recording sheet 16, which is positioned between the tension roller 22 and a driven roller 24.

Reference numeral 26 represents a driving motor for the driving roller 18, and 28 is a controller. The extruding ports 12 of the recording head 10 are, as shown in FIG. 5, independently provided in accordance with respective pixels in the width direction of the recording sheet 16 (a direction substantially orthogonal to the recording sheet running direction). The respective extruding ports 12 within the image forming width are used as the image recording liquid extruding ports 12A which extrude a mixture liquid, i.e., an image recording liquid obtained by controlling a mixing proportion of recording liquids (image forming liquid and image non-forming liquid) based on an image signal. The extruding ports 12 outside the image forming width are used as the dummy liquid extruding ports 12B, and these extrude a dummy liquid.

The image non-forming liquid forms substantially no image after image formation, i.e., after application of the recording liquid. Examples of the image non-forming liquid include a liquid which substantially becomes transparent after dried, a UV ray-curing liquid which substantially becomes transparent after cured, a liquid which is cured by thermal or chemical reaction to substantially become transparent, and a liquid which evaporates after the image formation and substantially vanishes. Moreover, the image non-forming liquid may be a liquid having a background color of the image. In the specification, the image non-forming liquid will also be referred to simply as the clear liquid.

For example, the image forming liquid is black ink and the clear liquid is clear or transparent ink. The density of an image to be recorded can be changed in the multistage (e.g., 256 tones) by varying a mixing ratio or proportion of the both liquids. The dummy liquid substantially contains no image forming substance, and is usually clear or transparent liquid, and the same liquid as the image non-forming liquid may be used.

The formed image is not limited to a visually recognizable image. With an electromagnetically perceptible image, for example, with a magnetic image, the image forming liquid is a magnetic ink, and the image non-forming liquid and dummy liquid are provided with no magnetism.

Figure 2:
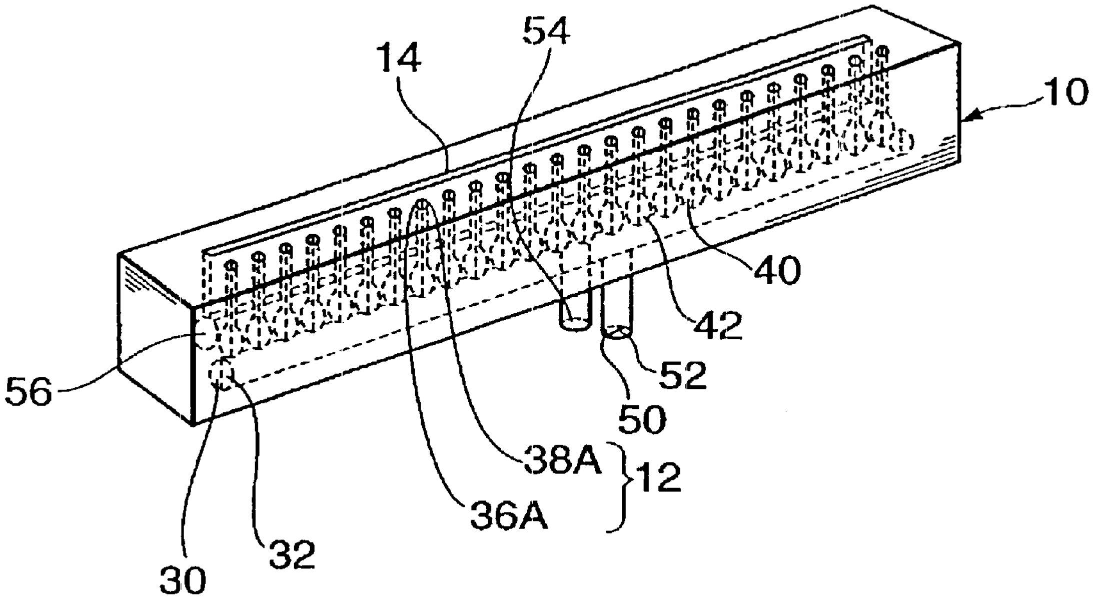
FIG. 2 is a perspective view of an inner structure of a recording head for use in the coating apparatus of FIG. 1.
Figure 3:
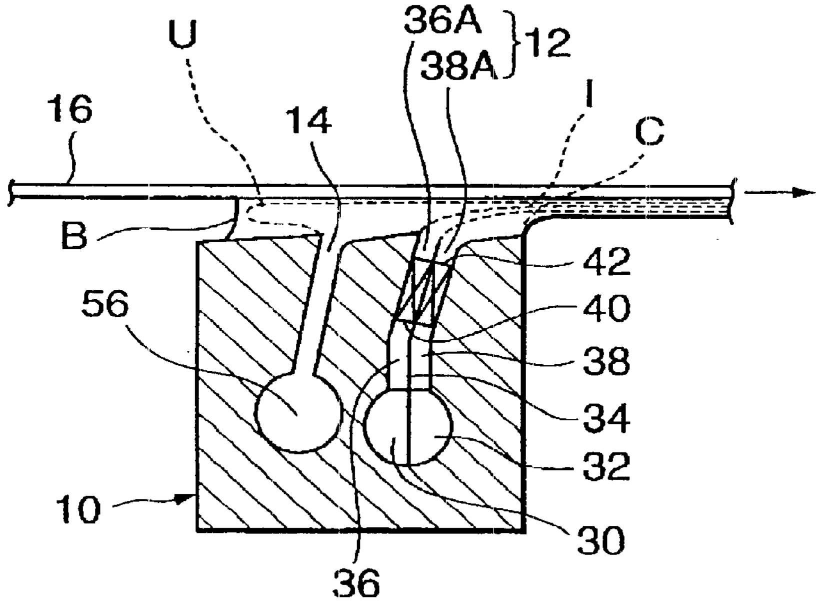
FIG. 3 is an enlarged sectional view of the recording head of FIG. 2.
Figure 6:
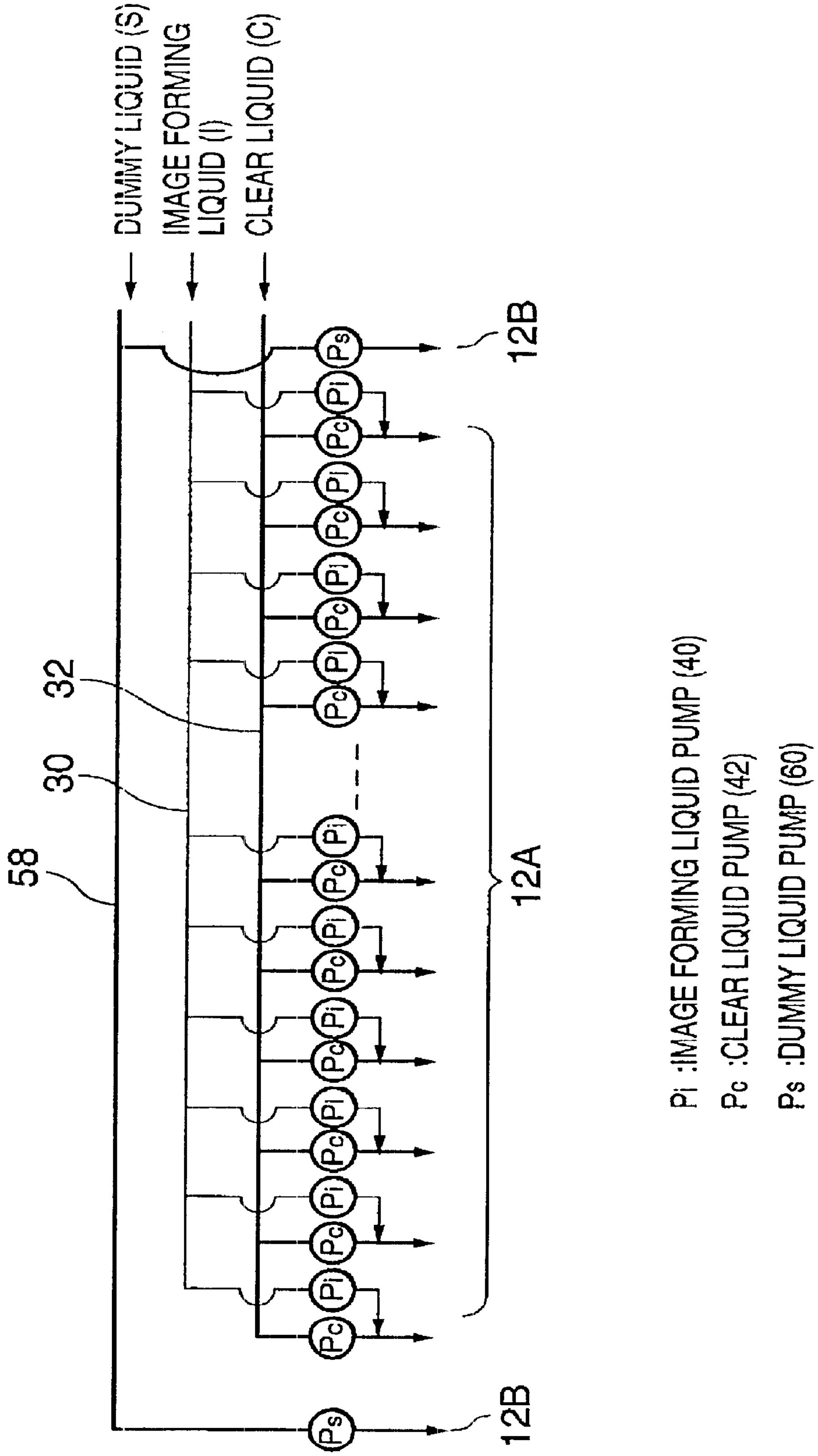
FIG. 6 is an explanatory view of flow paths for supplying the image forming liquid, clear liquid, and dummy liquid in the first embodiment.

The mixing proportion of the image forming liquid and clear liquid to form the image recording liquid is controlled by the controller 28 as follows. Specifically, in the recording head 10, one feed path 30 for supplying image forming liquid and the other feed path 32 for supplying clear liquid are formed in the width direction of the head, as shown in FIGS. 3, 6. The inside of each extruding port 12 is divided by a partition 34 into two passages 36, 38 as seen in FIG. 3, and these passages 36, 38 communicates with the feed path 30 for supplying the image forming liquid and the feed path 32 for supplying the clear liquid, respectively. The other ends of the respective passages 36, 38 is outlets 36A, 38A which extrudes the image forming liquid and a clear liquid, respectively (FIG. 2). These outlets 36A, 38A are formed in the extruding port 12, so that the coating liquids extruded from the outlets 36A, 38A are combined in the port 12 and extruded from the port 12 as a laminar flow of the combined image recording liquid. Further, an image forming liquid extrusion amount control pump 40 and a clear liquid extrusion amount control pump 42 are provided to these. passages 36, 38 as coating liquid extrusion amount controlling means.

Figure 4:
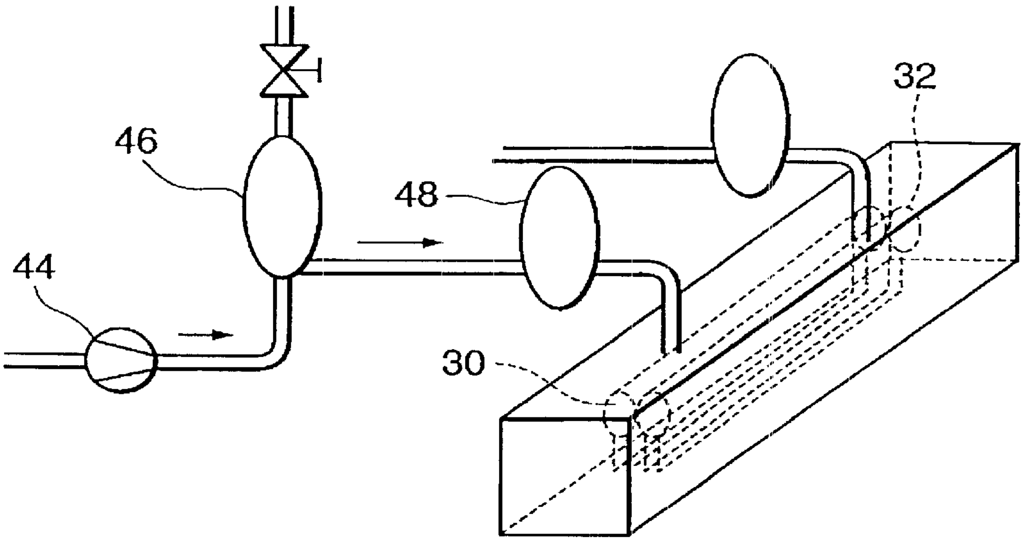
FIG. 4 is a schematic view of a feed path for supplying coating liquids such as an image forming liquid and a clear liquid.

As shown in FIG. 4, the image forming liquid (ink) is supplied with a fixed pressure from a pump 44 to the feed path 30. In FIG. 4, numeral 46 is a dumper which absorbs pulses of the extrusion pressure of the pump 44 to maintain the extrusion pressure constant. 48 is a filter which removes residue deposits formed or contaminating in the liquid. Similarly, the clear liquid is fed to the feeding path 32 with a constant pressure by the action of not-shown pump, and the structure of the pump and other parts is the same with that of the feeding path 30 for supplying the image forming liquid.

The image forming liquid and the clear liquid are supplied through an image forming liquid supply port 50 and a clear liquid supply port 52 to the feed paths 30 and 32, respectively.

Similarly, as seen in FIG. 2, the undercoating liquid is supplied from an undercoating liquid supply port 54 to a feed path 56 by a not-shown pump. The feed path 56 for supplying the undercoating liquid is elongated in the width direction of the recording head 10, and the slot-shaped opening 14 communicates with this feed path 56. The slot-shaped opening 14 is positioned on the upstream side of the aligned extruding ports 12 with respect to the running direction of the recording sheet 16 as shown in FIGS. 1 and 3. With such construction, on the surface of the recording sheet 16 is uniformly applied the undercoating liquid and thereafter applied the mixed liquid, i.e., the composite recording liquid extruded from the extruding port 12.

As described above, among the coating liquid extruding ports 12, the ports outside the image forming width correspond to the dummy liquid extruding ports 12B. As not shown in FIGS. 2, 4, the dummy liquid extruding ports 12B communicate with a dummy liquid feed path 58 which is formed in the recording head as shown in FIG. 6. Specifically, the recording head is also provided with a dummy liquid extrusion amount control pump (Ps) 60, whose structure is similar to those of the image forming liquid extrusion amount control pump (Pi) 40 and the clear liquid extrusion control pump (Pc) 42. The dummy liquid is fed to the dummy liquid extruding port 12B by the pump 60.

In FIG. 5, a plurality of dummy liquid extruding ports 12B are disposed on both outer sides of the image forming width. The respective ports 12B are controlled by the dummy liquid extrusion amount control pump 60 in order to provide the same extrusion amount. Although FIG. 6 shows one dummy liquid extruding port 12B and one pump 60 on each outer side of the image forming width, a plurality of the ports 12B may be disposed as shown in FIG. 5, or one extruding port 12B and one pump 60 may be disposed as shown in FIG. 6.

The control pumps 40, 42, 60 with the similar structure can be used. For example, a diaphragm pump driven by a piezoelectric element is suitable. It is to be noted that these pumps 40, 42, 60 and the feed paths 30, 32, 58 for accommodating these control pumps 40, 42, 60 can be produced by a micro-machine manufacture method to which a technique used in a manufacture process for a semiconductor device or the like is applied. Although the respective coating liquid extruding ports 12 are illustrated at a large interval in FIG. 2, they are actually disposed at remarkably narrow intervals of pixels.

Figure 5A:
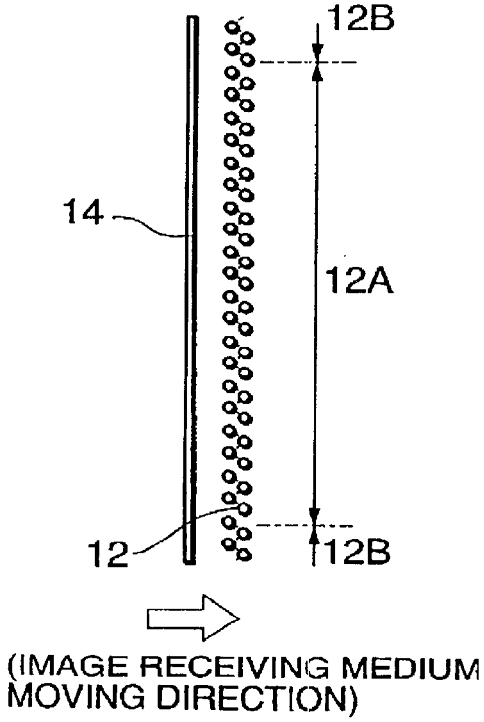
FIGS. 5A, 5B are diagrams of an array example of extruding ports of the image recording liquid and dummy liquid.
Figure 5B:
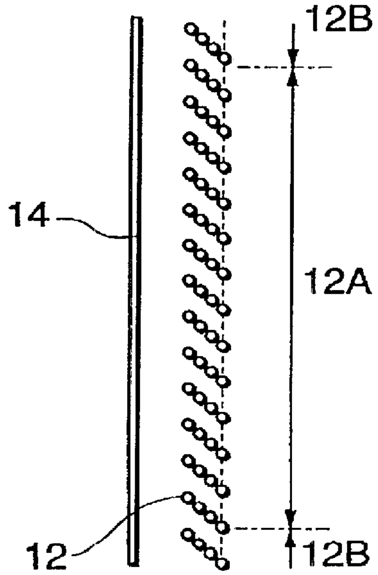

In order to narrow an interval of the coating positions by each extruding port 12, the adjacent extruding ports 12 may be displaced in the feeding direction of the recording sheet 16 as shown in FIGS. 5A and 5B. FIG. 5A shows that the adjacent extruding ports are alternately biased in the opposite directions and FIG. 5B shows that an appropriate number (e.g., four) of the extruding ports 12 are arranged so as to be sequentially biased in one direction. In FIGS. 5A and 5B, the image receiving medium or recording sheet 16 is fed to the right-hand direction. When each extruding port 12 is biased in this manner, it is needless to say that the controller 28 needs to change timings for operating the pumps 40, 42 and the dummy liquid pump 60 for different pixels in accordance with a bias quantity.

According to this embodiment, the controller 28 determines the operation timing and extrusion amount of the pumps 40, 42 so that the mixing proportion of the image forming (black) liquid and clear liquid corresponds to each pixel density based on an image signal. The determined timing and extrusion amount is fed to the respective control pump 40, 42 so that the extrusion amount and timing of the black and clear liquids are controlled by the control pump 40, 42. As a result, the black liquid and the clear liquid having the controlled amount corresponding to each pixel density are extruded from the respective outlets 36A, 38A into the extruding port 12A to form a composite recording liquid, i e., an image recording liquid. The image recording liquid in the port 12A is extruded from the port 12A. Moreover, a predetermined amount of dummy liquid is extruded from the dummy liquid extruding port 12B. On the other hand, a predetermined amount of undercoating liquid is constantly extruded from the slot opening 14 in a strip, plane or film-like form.

Accordingly, when the recording sheet 16 is fed in a predetermined direction by the motor 26, the undercoating liquid is first applied in a uniform thickness, thereby the recording sheet 16 is subjected to surface treatment. The image recording liquid having a predetermined density and dummy liquid extruded from the respective coating liquid extruding ports 12A, 12B are applied on the undercoating liquid. By changing the mixing proportion of the image forming liquid and clear liquid in the image recording liquid, the image density on the recording sheet 16 varies with a mono-tone gradation.

The dummy liquid is supplied along both edges of the image recording liquid, and prevents the edge of the image recording liquid from being raised or being spread outward in the width direction. Therefore, an extrusion volume flow rate per unit coat width is preferably set not to exceed the extrusion volume flow rate per unit coat width of the image recording liquid, and it is further preferable to set both flow rates to be substantially the same flow rate. Since the dummy liquid preferably generates no distortion and exerts no influence on a flow of image recording liquid, surface tension, viscosity and temperature of the dummy liquid are further preferably substantially the same as those of the image recording liquid.

A gap size between the recording head 10 and the recording sheet 16 is determined in consideration to a balance of extrusion pressures from the extruding port 12 and the slot opening 14, respectively, and a tension applied to the recording sheet 16. In this gap, the image recording liquid L formed by the image forming liquid I and the clear liquid C, the dummy liquid S, and the undercoating liquid U make a liquid bank, i.e., a bead B (as seen in FIG. 3). In order to form an image which is free from distortion, it is required that the image recording liquid L is orderly and smoothly transferred to the recording sheet 16 without distortion in the bead B.

According to this embodiment, as shown in FIG. 3, a stream line of the undercoating liquid U is bent from the slot opening 14 toward the upstream direction (the left-hand direction) in the bead B and further bent toward the downstream direction (the right-hand direction). Since the undercoating liquid U is transparent, occurrence of turbulence in the stream line of the undercoating liquid in the bead B does not result in any disadvantages. The image forming liquid I and the clear liquid C are supplied so as to be superimposed on the undercoating liquid U which has made a U-turn on the upstream side in the bead B to become a straightened flow. The image forming liquid I and the clear. liquid C flow without any turbulence, thereby forming an excellent image.

Further, in this embodiment, the extruding port 12 and the slot opening 14 have the front edge shape formed on the wall surface on the downstream side which is bent along the stream line toward the downstream side (the right-hand side) and have the front edge shape formed on the wall surface on the upstream side which is tapered toward the downstream side. Therefore, any sinuosity or turbulence in the stream line of the coating liquid cannot be observed in particular, and the coating liquid can smoothly flow on the undercoating liquid. In addition, since the clear liquid extruding outlet 38A (FIG. 3) is positioned to be closer to the downstream side than the image forming liquid extruding outlet 36A, the clear liquid C can intervene between the image forming liquid I and the upper surface of the recording head 10. Accordingly, even if the clear liquid C comes into contact with the upper surface of the recording head 10 to generate a delay, the delay of the image forming liquid I is small, and the image quality is further improved.

Figure 7:
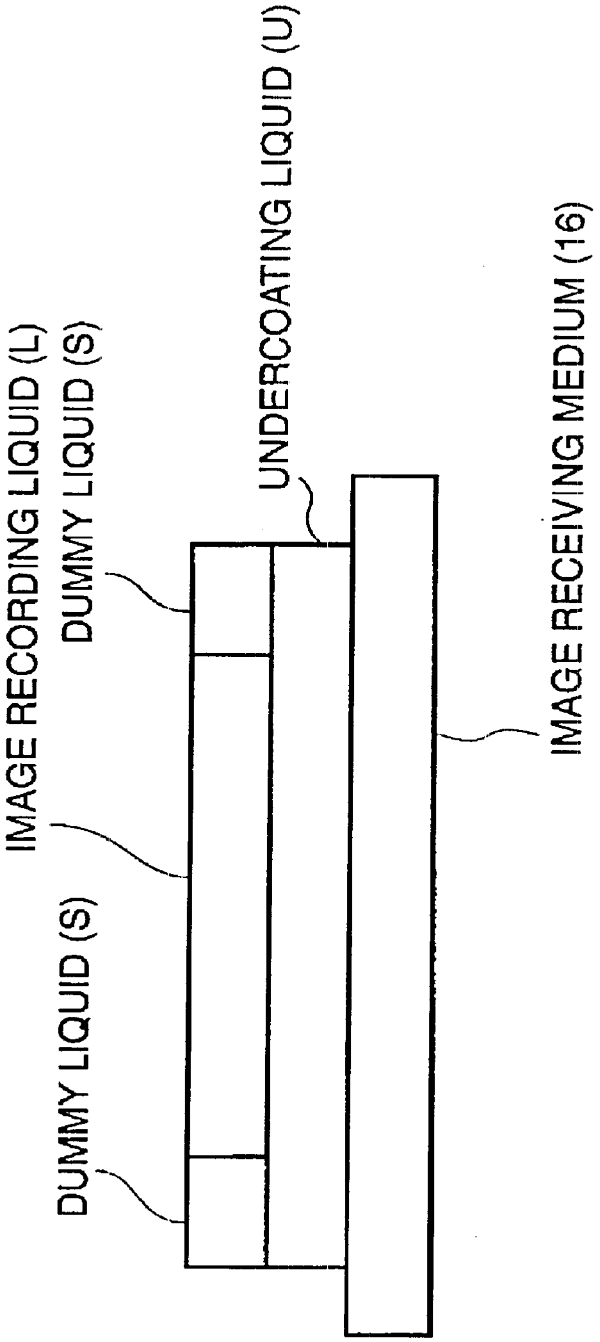
FIG. 7 is a schematic view showing the inner structure of the layered coating liquids in the first embodiment.

Since the dummy liquid S is supplied along both edges of the image recording liquid L, the image recording liquid L and dummy liquid S are combined in the strip shape and superposed on the undercoating liquid U as shown in FIG. 7. Therefore, the image recording liquid L is applied with both edges held by the dummy liquid S, and the distortion of both edges of the image recording liquid L is prevented. Additionally, the coat width of the undercoating liquid U is the same as or larger than the total width of an image forming width and coat widths of the dummy liquid on both sides.

Figure 8A:
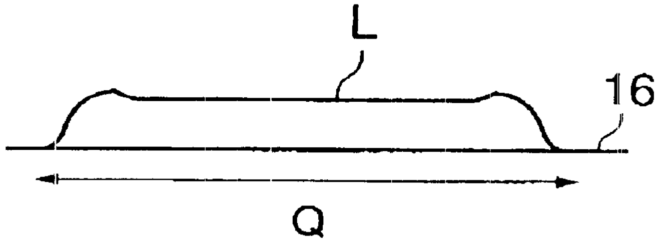
FIGS. 8A to 8C are sectional views of a coating state of the image recording liquid according to the first embodiment.
Figure 8B:
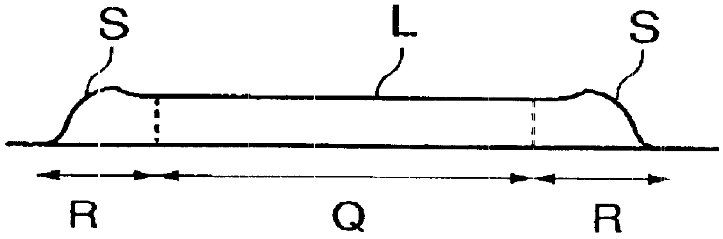
Figure 8C:
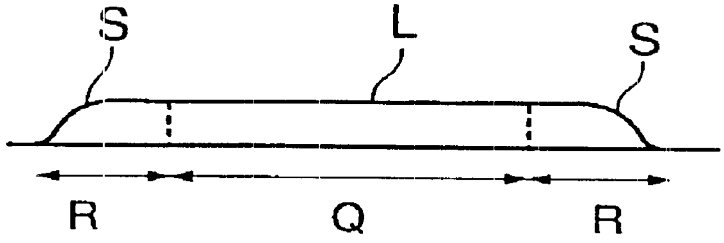

FIGS. 8A–8C are sectional views showing a coating state on the recording sheet 16 in the width direction. In the figures, Q denotes an image forming area, and R denotes a dummy liquid coating area. FIG. 8A shows that no dummy liquid S is applied, and as clearly seen from the figure, the image recording liquid L is raised by its surface tension on both edges of the image forming area, and image distortion is generated. FIGS. 8B, 8C show that the dummy liquid S is applied. In FIG. 8B, since the image recording liquid L continues to the dummy liquid S, the edge of the image recording liquid L fails to be distorted. The edge of the dummy liquid S is raised and distorted by the surface tension, but when the dummy liquid S is transparent, the distortion fails to influence image quality. FIG. 8C shows that the surface tension of the image recording liquid L and dummy liquid S is small. In this case, a coat thickness of the dummy liquid S smoothly changes to be thinned toward the outside, but the coat thickness of the image recording liquid L is kept to be constant over the entire image forming area Q. This fails to deteriorate the image quality.

In this embodiment, since one image forming liquid and one clear liquid are supplied to each extruding port 12A, it is possible to form an image whose density can vary with a single color. However, by using and combining plural image forming liquids having a plurality of colors (e.g., yellow, magenta, cyan, and black) to extrude from a common extruding port, a colored image can be formed or recorded.

Preferably, a decoloration preventing agent is contained in the undercoating liquid, the clear liquid, the dummy liquid or the image forming liquid in order to avoid deterioration of the recording liquid due to ultraviolet rays or oxidation. As a decoloration preventing agent, there can be used, for example, an antioxidant, an UV absorber or a given kind of metallic complex (e.g., Ni complex). Examples of antioxidants, include chroman-based compounds, coumarane-based compounds, phenol-based compounds (e.g., hindered-phenols and the like), hydroquinone derivatives, hindered-amine derivatives, spiroindan-based compounds and others. Moreover, a compound disclosed in Unexamined Japanese Patent Publication (KORAI) No. 159644/1986 is also effective.

As an UV absorber, there can be used benzotriazol-based compounds (U.S. Pat. No. 3,533,794), 4-thiazolidone-based compounds (U.S. Pat. No. 3,352,681), benzophenone-based compounds (Unexamined Japanese Patent Publication (KOKAI) No. 2784/1981) and other compounds disclosed in Unexamined Japanese Patent Publication (KOKAI) Nos. 48535/1979, 136641/1987, 88256/1986 and others. Further, the UV absorbing polymer disclosed in Unexamined Japanese Patent Publication (KOKAI-) No. 260152/1987 is also effective. As a metallic complex, it is possible to employ compounds disclosed in U.S. Pat. Nos. 4,241,155 and 4,245,018, Unexamined Japanese Patent Publication (KOKAI) Nos. 174741/1987 and 88256/1986, Japanese Patent Application Nos. 234103/1987, 31096/1987 and 230596/1987.

An example of the useful decoloration preventing agent is disclosed in Unexamined Japanese Patent Publication (KOKAI) No. 215272/1987. To avoid color deterioration of the pigment transferred to the image receiving material, the decoloration preventing agent may be included in the image receiving medium in advance or it may be supplied from the outside by a method for transferring from a pigment extending material and the like. The antioxidant, the UV absorber and the metallic complex described above may be combined to be used. Additionally, the antioxidant, the UV absorber and the metallic complex described above may be used as an emulsified substance.

Second Embodiment

Figure 9:
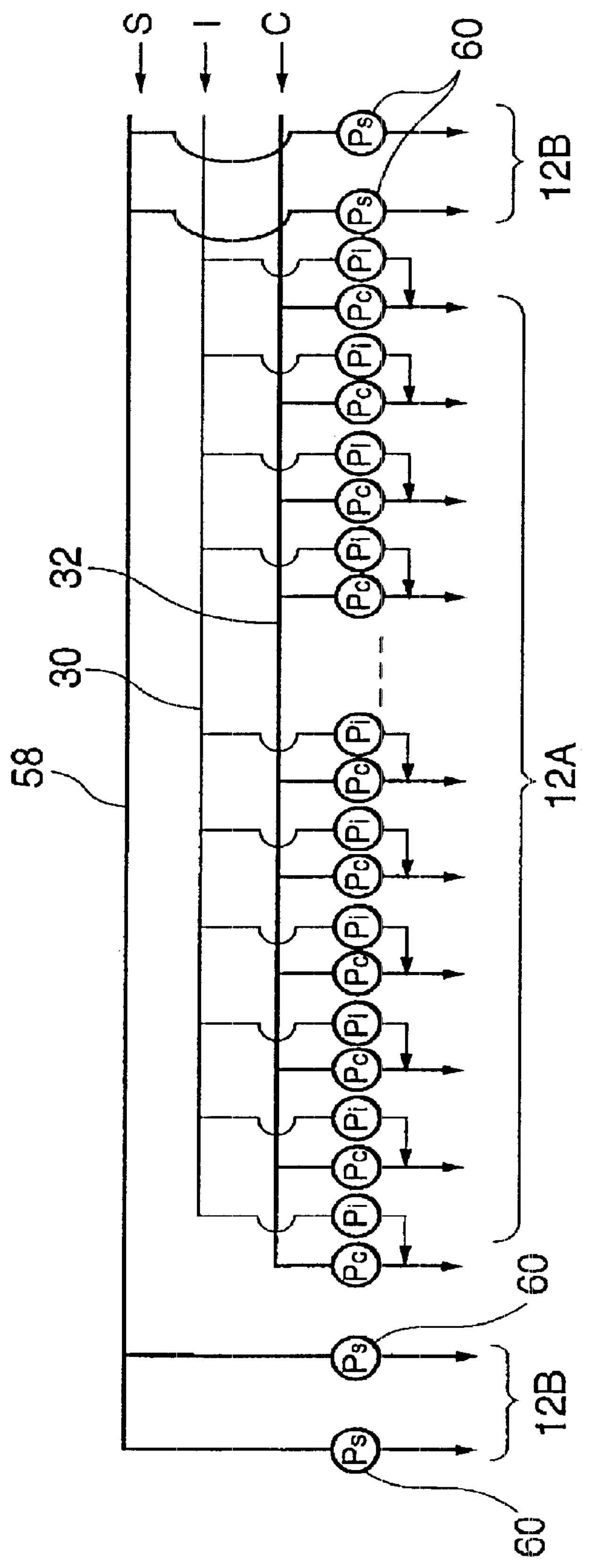
FIG. 9 is an explanatory view of the flow paths for supplying the image forming liquid, clear liquid and dummy liquid according to a second embodiment of the present invention.

FIG. 9 is an explanatory view of flow paths of the image forming liquid, clear liquid, and dummy liquid according to the recording head of a second embodiment of the present invention. In the second embodiment, a plurality of dummy liquid extruding ports 12B are disposed on both sides of the image forming width, and a plurality of dummy liquid extrusion amount control pump 60 (Ps) for separately controlling extrusion amounts of the dummy liquid extruded from the respective extruding ports 12B are disposed.

According to the present embodiment, by separately controlling the extrusion amounts of the plurality of dummy liquid extruding ports 12B, the coat thickness of the dummy liquid in the image forming width direction can be changed. For example, the coat thickness of the dummy liquid is gradually reduced toward the outside of the image forming area. Specifically, the extrusion volume flow rate per unit coat width of the dummy liquid is reduced toward the outside. This can prevent the image from being distorted and prevent a coat edge from being conspicuous. Since the same portions as those of FIG. 6 are denoted with the same reference numerals in FIG. 9, the description thereof is not repeated.

Third Embodiment

Figure 10:
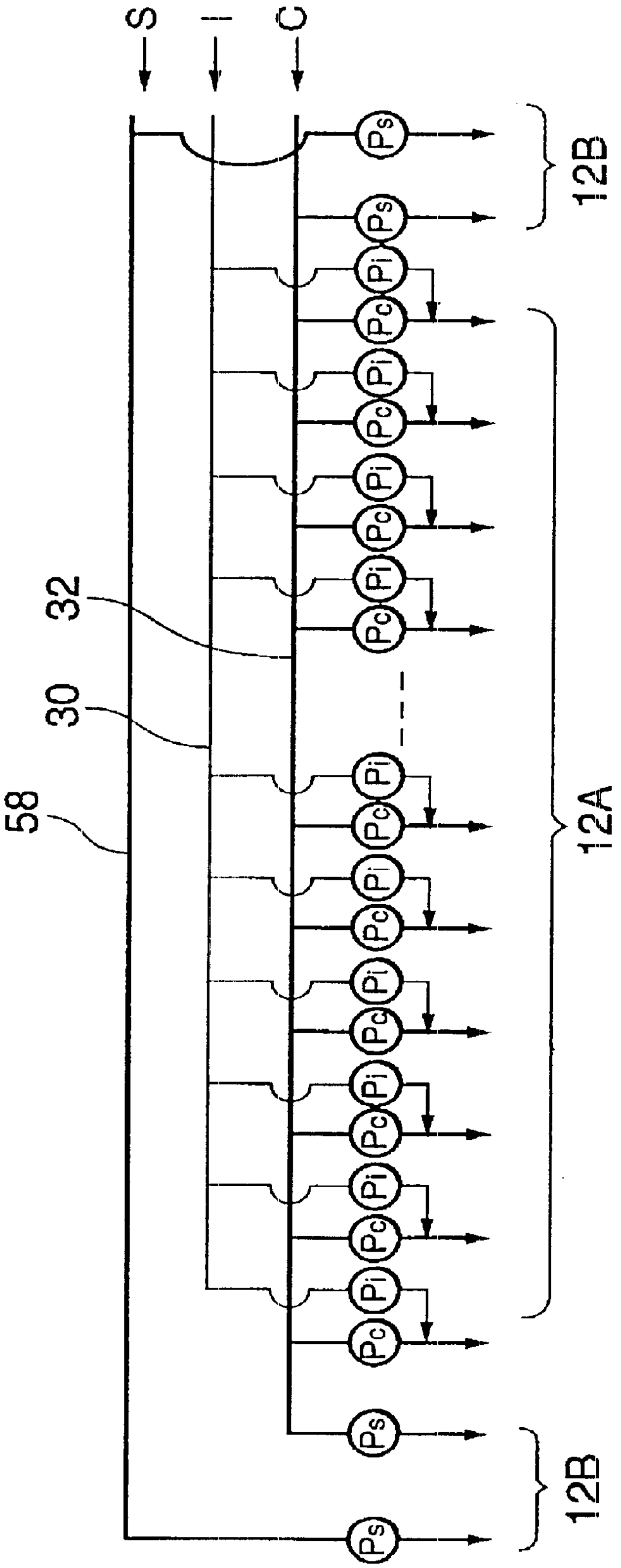
FIG. 10 is an explanatory view of the flow paths of the image forming liquid, clear liquid and dummy liquid according to a third embodiment.

FIG. 10 is an explanatory view of the flow paths of the image forming liquid, clear liquid, and dummy liquid in the recording head according to a third embodiment of the present invention. In the embodiment, among the plurality of dummy liquid extruding ports 12B, the extruding port 12B adjacent to the outermost image recording liquid extruding port 12A extrudes a clear liquid. The clear liquid for use in the image recording liquid is also utilized as a dummy liquid.

According to the embodiment, since the dummy liquid and the image recording liquid have the same constituent, i.e., the clear liquid, the repulsion between the dummy liquid and the image recording liquid can be reduced or omitted. The distortion of the image quality is further securely prevented and image quality can be enhanced. Moreover, by making differences in the dummy liquid extrusion amounts from a plurality of dummy liquid extruding ports 12B, the dummy liquid coat thickness can also be changed.

Fourth Embodiment

Figure 11:
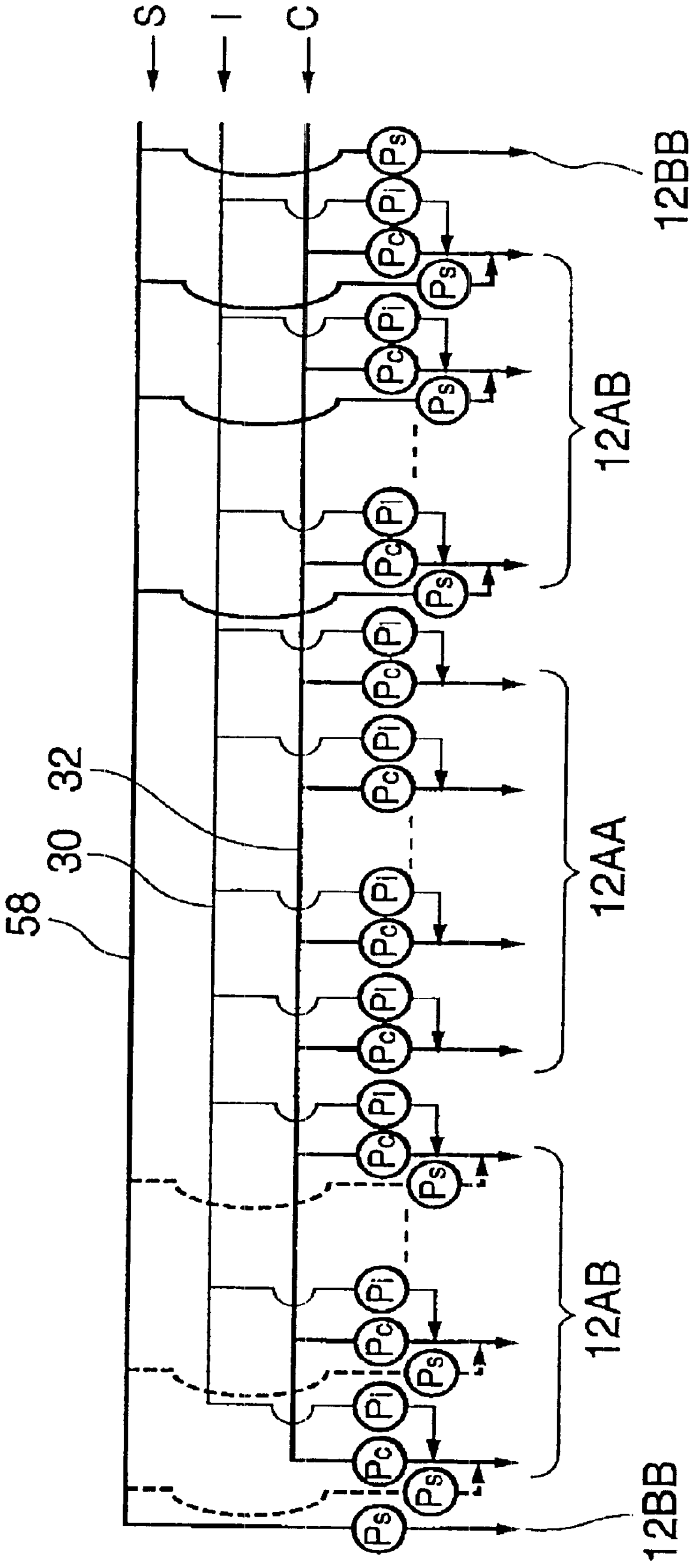
FIG. 11 is an explanatory view of the flow paths of the image forming liquid, clear liquid and dummy liquid according to a fourth embodiment.

FIG. 11 is an explanatory view of the flow paths of the image forming liquid, clear liquid, and dummy liquid in the recording head according to a fourth embodiment of the present invention. In the embodiment, at least some of the coating liquid extruding ports 12 can be used (diverted) as the dummy liquid and image recording liquid. Specifically, extruding ports 12AA exclusive for the image recording liquid are disposed in the middle of the array, extruding ports 12AB which can be used in both the image recording liquid and dummy liquid are disposed on both sides, and an extruding port 12BB exclusive for the dummy liquid is further disposed outside.

According to the embodiment, with a change of image forming width, the dual purpose extruding ports 12AB are used for extruding the image forming liquid or dummy liquid. When the image forming width to be formed is broader than the width of the array of the dedicated extruding ports 12AA for the image forming liquid, the dual purpose extruding ports 12AB covering the range not covered by the ports 12AA are used for extruding the image forming liquid. The dual purpose extruding port 12AB beyond the range of the image forming width is used for extruding the dummy liquid to form a dummy liquid coating area on the recording sheet 16. The dummy liquid coating area may be constituted by adding the dedicated extruding ports 12BB for the dummy liquid as occasion demands. With such arrangement, the coat width of the image can arbitrarily be changed. Therefore, it is unnecessary to prepare different recording heads for respective different image forming widths, and it is possible to inexpensively form high quality level images different in size. The same recording head can be used to form the images different in width, and it is easy to change the image forming width.

Fifth Embodiment

Figure 12:
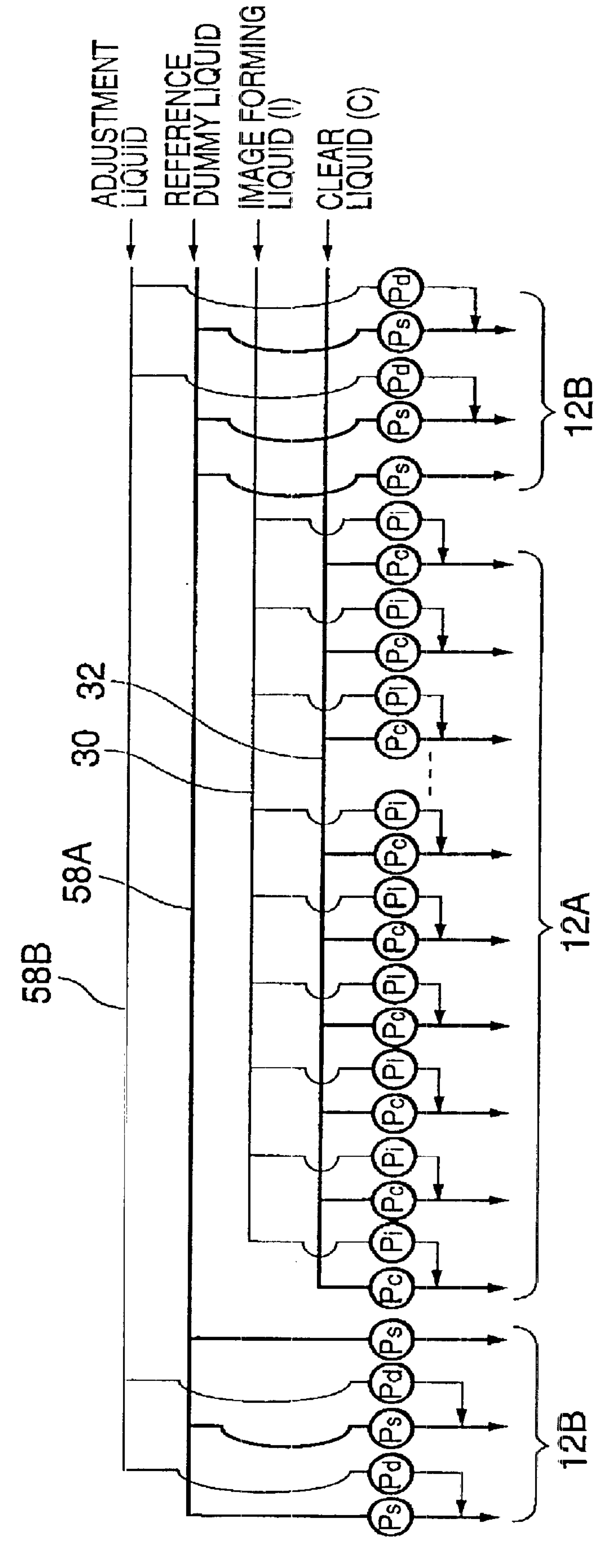
FIG. 12 is an explanatory view of the flow paths of the image forming liquid, clear liquid and dummy liquid according to a fifth embodiment.

FIG. 12 is an explanatory view of the flow paths of a fifth embodiment. In the embodiment, the plurality of dummy liquid extruding ports 12B are disposed on each of both outer sides of the image forming width, and at least one of viscosity and surface tension of the dummy liquid extruded from the dummy liquid extruding port 12B can be changed in the width direction in a stepwise manner.

For example, a part of the dummy liquid extruded from the respective extruding ports 12B is prepared by mixing a reference dummy liquid supplied from a reference dummy liquid feed path 58A and an adjustment liquid supplied from an adjustment liquid feed path 58B. The adjustment liquid is different from the reference dummy liquid in at least one of the viscosity and surface tension, and by changing the-mixing proportion of the reference dummy liquid and adjustment liquid, the viscosity or the surface tension of the dummy liquid coating area can be changed in the width direction in the stepwise manner. When two liquids, i.e., the reference dummy liquid and adjustment liquid are merely provided, by changing the mixing proportion, three or more types of dummy liquids different in property can be obtained. The image distortion can further securely be prevented with a simple system.

Sixth Embodiment

Figure 13:
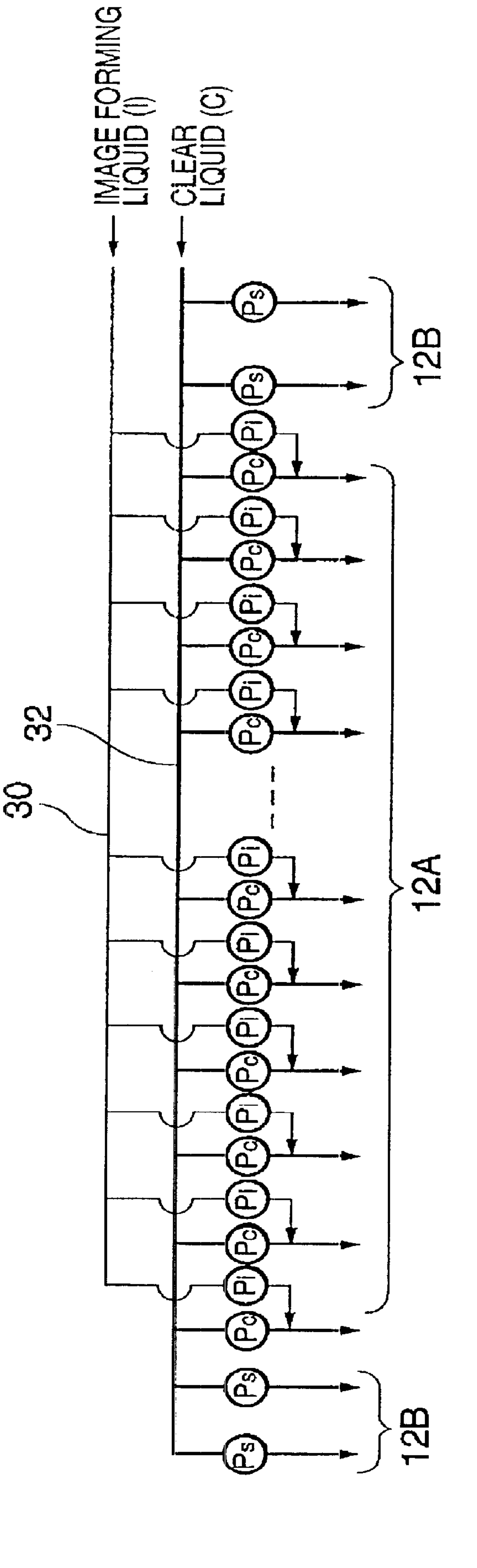
FIG. 13 is an explanatory view of the flow paths of the image forming liquid, clear liquid and dummy liquid according to a sixth embodiment.

FIG. 13 is a flow path explanatory view of a sixth embodiment. In the present embodiment, as the dummy liquid in FIG. 6 (first embodiment), the clear liquid used in the image recording liquid is utilized. Specifically, the clear liquid from the feed path 32 is supplied as the dummy liquid to the dummy liquid extruding port 12B. In this case, a physical property of the dummy liquid approaches that of the image recording liquid, and the image distortion is reduced. Additionally, by keeping the volume flow rate of the image recording liquid to be constant, the extrusion flow rate of the dummy liquid can only be managed to be constant, and it is easy to control the dummy liquid. According to the present embodiment, since the liquid type for use is reduced, it becomes easy to operate the apparatus, and it is possible to simplify the recording head structure.

Seventh Embodiment

Figure 14:
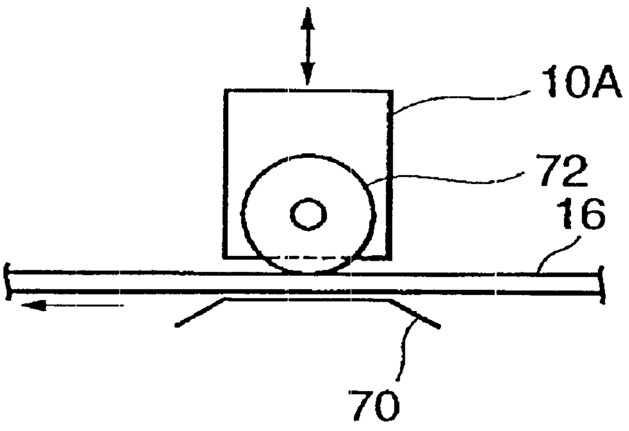
FIG. 14 is a diagram of the image forming apparatus (coating apparatus) according to a seventh embodiment of the present invention to which the slot coating method is applied.
Figure 15:
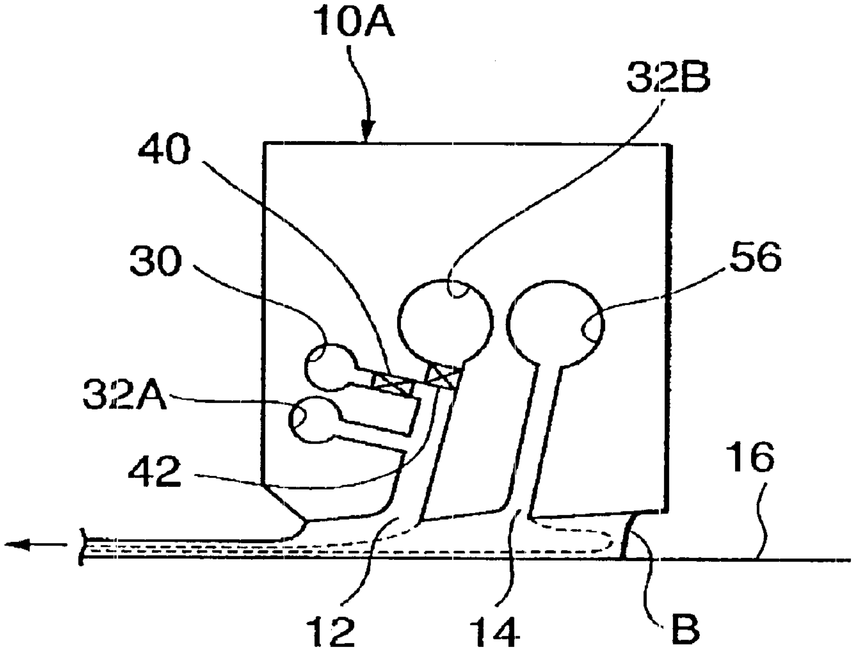
FIG. 15 is an enlarged sectional view of the recording head of FIG. 14.

FIG. 14 is a diagram of a seventh embodiment by the slot coating method, and FIG. 15 is an enlarged sectional view of a recording head 10A. The recording head 10A transfers the image recording liquid and dummy liquid to the top surface of the image receiving medium or the recording sheet 16 fed horizontally.

The recording sheet 16 is attached to the top surface of a platen 70 and fed in one direction (from right to left in FIG. 14). The recording head 10A is held above the platen 70 in such a manner that the head can vertically move, and auxiliary rollers 72 (one of them is shown in FIG. 14) disposed on both ends of the width direction of the recording head 10A abut on both edges of the recording sheet 16 in a rolling manner. This auxiliary roller 72 keeps a gap between the recording head 10A and the recording sheet 16 to be constant.

In the recording head 10A, the supply amount of the image forming liquid supplied from the feed path 30 is controlled by the control pump 40. Moreover, the clear liquid is supplied in two divided layers to sandwich the image forming liquid from both sides. Specifically, one feed path 32A constantly extrudes a fixed amount of the clear liquid, and an amount of the clear liquid extruded from the other feed path 32B is varied by the control pump 42. The two clear liquids and the image forming liquid are controlled in such a manner that the total volume flow rate substantially becomes constant. Therefore, the overall amount of the coating liquid extruded from the extruding ports 12 becomes constant, and stable coating is possible.

Furthermore, the undercoating liquid extruding slot 14 is opened on the upstream side from the coating liquid extruding port 12. Thus, the stream line of the undercoating liquid constantly supplied by a predetermined amount from the feed path 56 may be folded back to the upstream side in the bead B according to circumstances, but the coating liquid with a three-layer structure in which the image forming liquid is sandwiched by the two clear liquid from the both sides is superposed and fed onto the stable undercoating liquid. Therefore, the distortion is not generated in an image.

Additionally, since both sides of the image forming liquid are held by the clear liquid (dummy liquid), the clear liquid (dummy liquid) directly abuts on an inner wall surface of the recording liquid extruding port 12, the image forming liquid smoothly flows and the image quality is further enhance.

Moreover, according to the seventh embodiment, since the coating liquid extruding port 12 and undercoating liquid extruding port 14 are opened in the lower surface of the recording head 10A, dust or rubbish fails to easily adhere to these extruding ports 12, 14. Therefore, during coating the coating liquid is smoothly extruded, which is suitable for the image quality enhancement.

Eighth Embodiment

Next, coating of fore and rear ends of the image forming area with the dummy liquid will successively be described according to eighth, ninth embodiments.

Figure 16:
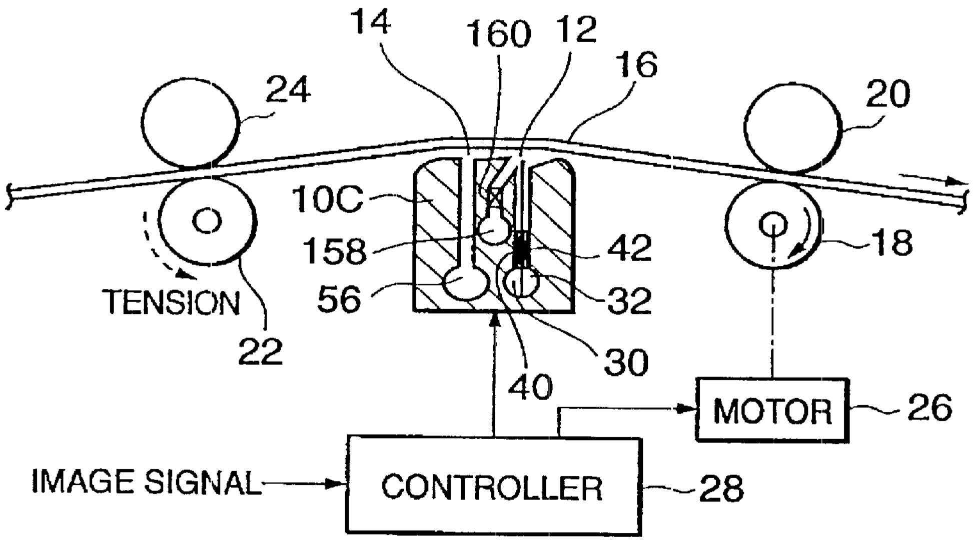
FIG. 16 is a diagram of the image forming apparatus (coating apparatus) according to an eighth embodiment of the present invention to which the slot coating method is applied.
Figure 17:
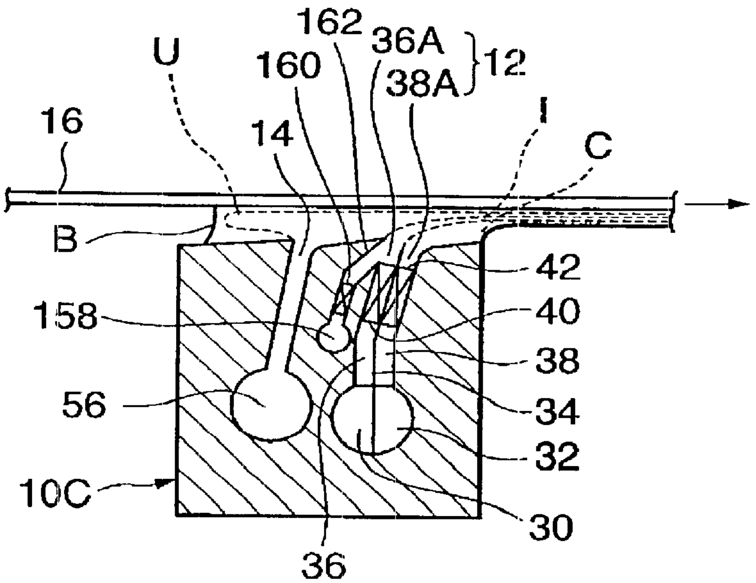
FIG. 17 is an enlarged sectional view of the recording head of FIG. 16.
Figure 18:
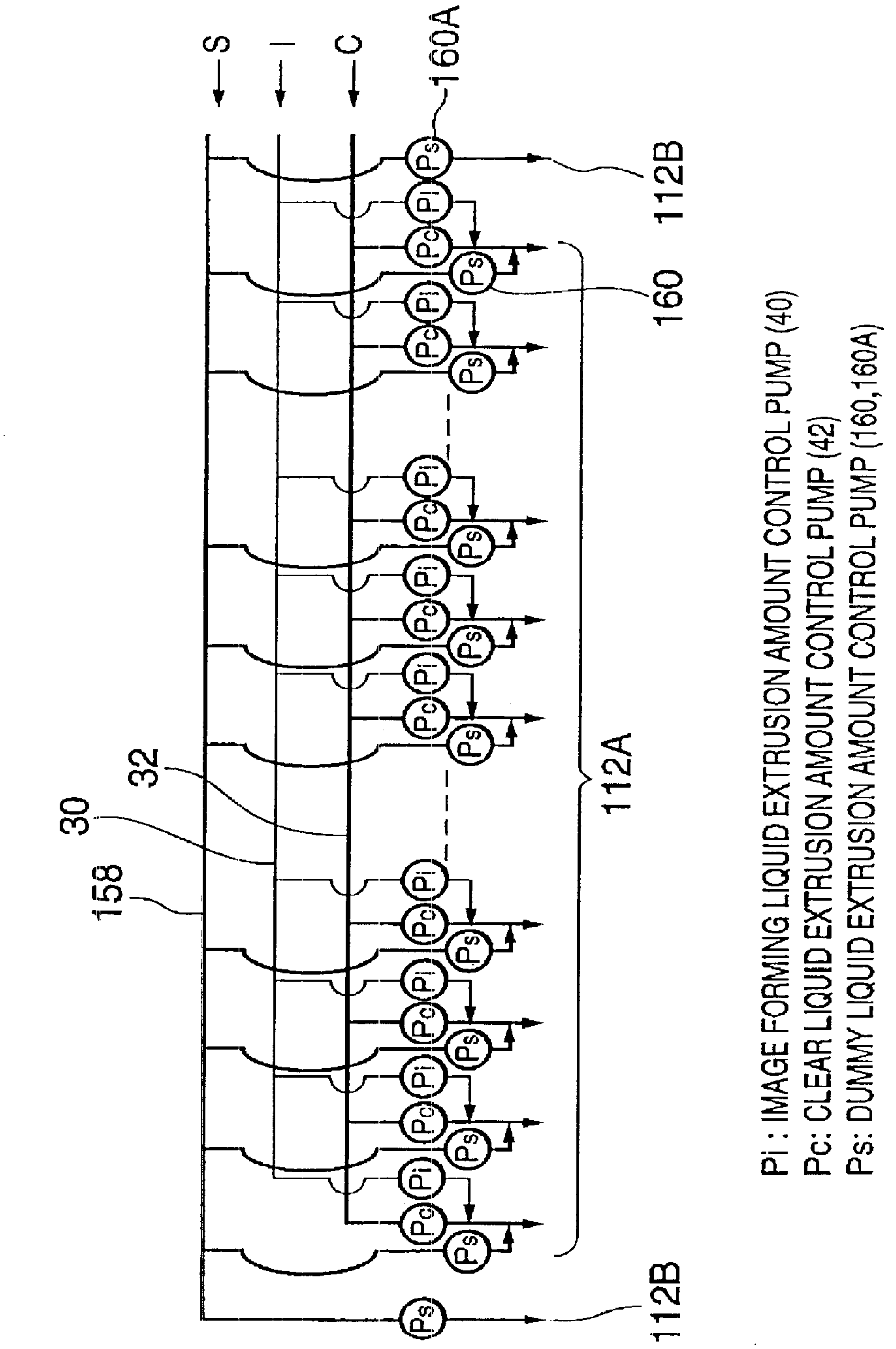
FIG. 18 is an explanatory view of the flow paths of the image forming liquid, clear liquid and dummy liquid according to the eighth embodiment.
Figure 19:
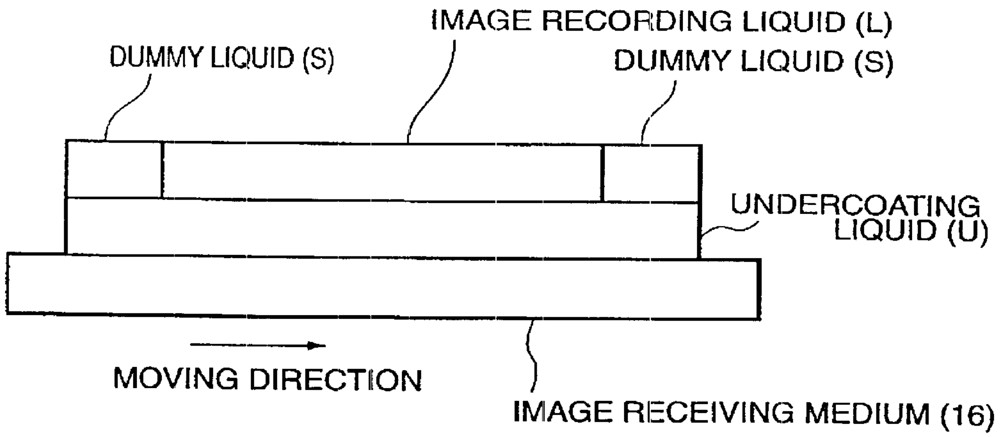
FIG. 19 is a schematic view of the inner structure of the layered coating liquids in the eighth embodiment.

FIG. 16 is a diagram of the eighth embodiment of the present invention to which the slot coating method is applied, FIG. 17 is an enlarged sectional view of the inner structure of the recording head for use herein, FIG. 18 is an explanatory view of the flow paths of the coating liquid and dummy liquid, FIG. 19 is a schematic view of the inner structure of the coating liquid, and FIG. 20 is a sectional view showing the coating state.

A coating liquid extruding port 112 disposed on a recording head 10C includes an image recording liquid/dummy liquid combined use extruding port 112A (hereinafter referred to simply as a combined use or dual purpose extruding port) and a dummy liquid extruding port 112B described later, and these are herein generically referred to as the coating liquid extruding port 112. The present embodiment is the same as the first embodiment shown in FIGS. 1 to 6 except the coating liquid extruding port 112 and an operation thereof, the same portions are denoted with the same reference numerals, and the description thereof is not repeated.

As shown in FIG. 18, the respective coating liquid extruding ports 112 within the image forming width are the dual purpose extruding ports 112A, these extrude the mixture liquid, that is, the image recording liquid L in which the mixing proportion of the image forming liquid I and clear liquid D is controlled based on the image signal, and the dummy liquid S can also be extruded instead of the image forming liquid L. The coating liquid extruding ports 112 outside the image forming width are the dummy liquid extruding ports 112B, and these extrude the dummy liquid S.

When the dual purpose extruding port 112A extrudes the image recording liquid, the mixing proportion of the image forming liquid I and clear liquid C to form the image recording liquid L is controlled by the controller 28 as follows. Specifically, in the recording head 10C, the image forming liquid feed path 30 and clear liquid feed path 32 are formed in the width direction. The inside of each coating liquid extruding port 112 is divided by the partition 34 (FIG. 17) into two passages 36, 38, and these passages 36, 38 communicate with the image forming liquid feed path 30 and the clear liquid feed path 32, respectively. The other ends of the respective passages 36, 38 is outlets 36A, 38A which extrudes the image forming liquid and clear liquid, respectively (see FIGS. 2, 17). These outlets 36A, 38A are disposed in the coating liquid extruding ports 12, so that the coating liquids extruded from the outlet 36A, 38A are combined in the port 12 and extruded from the port 12 as a laminar flow of the combined image recording liquid Furthermore, these passages 36, 38 are provided with the image forming liquid extrusion amount control pump 40 and clear liquid extrusion amount control pump 42 as the coating liquid extrusion amount control means.

When the dual purpose port 112A extrudes the dummy liquid, the controller 28 stops the image forming liquid extrusion amount control pump 40 and clear liquid extrusion amount control pump 42, and instead starts a dummy liquid extrusion amount control pump 160 described later. Specifically, in the recording head 10C, as shown in FIGS. 16 to 18, a dummy liquid feed path 158 is formed in the width direction, and the respective dual purpose ports 112A communicate with the dummy liquid feed path 158 via a dummy liquid passage 162. The dummy liquid is supplied to the feed path 158 by a pump (not shown). The dummy liquid passage 162 is provided with the control pump 160 as dummy liquid extrusion amount control means.

Similarly as the first embodiment shown in FIG. 2, the undercoating liquid is supplied to the slot-shaped opening 14 from the undercoating liquid feed path 56 which is formed long in the width direction of the recording head 10C. A recording surface of the image receiving medium 16 is uniformly coated with the undercoating liquid U extruded from the slot opening 14 positioned on the upstream side of the coating liquid extruding port 112 with respect to a feed direction (rightward direction) of the image receiving medium 16. Thereafter, the mixture liquid (i.e., the image recording liquid) or the dummy liquid extruded from the extruding port 12, is applied.

Among the coating liquid extruding ports 112, the ports outside the image forming width form the dummy liquid extruding ports 112B as described above. As shown in FIG. 18, these dummy liquid extruding ports 112B communicate with the dummy liquid feed path 158 formed in the recording head 10C. Specifically, the recording head 10C is provided with the image forming liquid extrusion amount control pump (Pi) 40, clear liquid extrusion amount control pump (Pc) 42, and dummy liquid extrusion amount control pump (Ps) 160A which is similar to the dummy liquid extrusion amount control pump 160 disposed in the dual purpose extruding port 112A, and this pump 160A feeds the dummy liquid to the dummy liquid extruding port 112B.

Additionally, a plurality of dummy liquid extruding ports 112B may be disposed on both outer sides of the image forming width similarly as the first embodiment. Moreover, in order to narrow the coating interval by each extruding port 112, the adjacent extruding ports 112 may be displaced in the same manner as the extruding port 12 of FIGS. 5A and 5B. When each coating liquid extruding port 112 is displaced in this manner, it is needless to say that the controller 28 needs to change the timings for operating the pumps 40, 42 and the dummy liquid pumps 160, 160A for different pixels in accordance with the bias quantity.

According to the eighth embodiment, the controller 28 coats the fore end of the image forming area with the dummy liquid before forming the image in the image forming area. Specifically, the extruding ports 112A and 112B extrude the dummy liquid. The dummy liquid may be applied in the same width as the width of the image forming area, or in a slightly larger width, or may be applied over the entire width of the recording sheet 16.

When the image forming area reaches the position of the coating liquid extruding port 112, the extruding of the dummy liquid is stopped, and the extruding of the image recording liquid is started. Alternatively, in consideration of time delay before the image forming liquid and clear liquid extruded by the pumps 40, 42 reach the recording sheet 16, when the front end of the image forming area comes before the extruding port 112 by the delay, the dummy liquid extruding is stopped and the image recording liquid extruding is started. Specifically, the controller 28 determines the operation timing and extrusion amount of the pumps 40, 42 to obtain the mixing proportion in accordance with each pixel density based on the image signal, and controls the pumps 40, 42, 160A. As a result, the determined amount of the image forming liquid and clear liquid is extruded from the extruding port 112A within the image forming width in accordance with each pixel density. Moreover, the extruding port 112B extrudes the predetermined amount of dummy liquid and applies the liquid to both sides of the width direction of the image forming area.

When the coating of the image forming area with the image recording liquid is completed, the controller 28 actuates the pumps 160, 160A to extrude the dummy liquid, which is continuously applied to the rear end of the image forming area. During these operations, the constant amount of undercoating liquid is constantly extruded in a strip, plane or film-like shape from the undercoating liquid extruding port 14.

Accordingly, when the recording sheet 16 is fed in the predetermined direction by the motor 26, the undercoating liquid is first applied in the uniform thickness, and the recording sheet 16 is subjected to surface treatment. The dummy liquid extruded from the coating liquid extruding port 112 is applied to the undercoating liquid on the fore end of the image forming area in the same width as the image forming width or in a larger width. Moreover, the image recording liquid with the determined density and dummy liquid are applied to the image forming area and both sides of the width direction, respectively, and as a result the monochromatic image with a variable density is formed on the recording sheet 16.

The dummy liquid applied to the front and rear ends of the image forming area prevents the image recording liquid from becoming thick on the front and rear edges or from spreading over the front and rear ends to be thinned. Moreover, the dummy liquid supplied along both edges of the image recording liquid prevents the side edge of the image recording liquid from becoming thick or from spreading to the outside of the width direction and thinned.

Therefore, the extrusion volume flow rate per unit coat width of the dummy liquid is preferably set not to exceed the extrusion volume flow rate per unit transfer width of the image recording liquid, and it is further preferable to set both flow rates to be substantially the same. Since the dummy liquid preferably generates no distortion and exerts no influence on the flow of image recording liquid, the surface tension, viscosity and temperature are further preferably substantially the same as those of the image recording liquid.

The gap size between the recording head 10C and the recording sheet 16 is determined by the balance between the extrusion pressures of the coating liquid and undercoating liquid extruded from the coating liquid extruding port 112 and undercoating liquid extruding slot 14, respectively, and the tension applied to the recording sheet 16. In this gap, the image recording liquid L formed by image forming liquid I and clear liquid C, dummy liquid S, and undercoating liquid U make a liquid bank, i.e., a bead B (as seen in FIG. 17). In order to form the image free of distortion, it is necessary to orderly transfer the image recording liquid L to the recording sheet 16 without distortion in the bead B.

According to the embodiment, as shown in FIG. 17, the stream line of undercoating liquid U is bent from the slot opening 14 toward the upstream side (the left-hand side) in the bead B and further bent back toward the downstream side (the right-hand side). Since the undercoating liquid U is transparent, the occurrence of turbulence in the stream line in the bead B provides no disadvantage. The image forming liquid I and clear liquid C are supplied so as to be superimposed on the undercoating liquid U which has made a U-turn on the upstream side in the bead B to become a straightened flow. The image forming liquid I and the clear liquid C flow without any turbulence, thereby forming an excellent image.

Furthermore; in the embodiment, for the extruding port 112 and slot opening 14, as shown in FIG. 17, the tip-end wall surface shape on the downstream side is bent along the stream line toward the downstream side (the right-hand side), and the tip-end wall surface shape on the upstream side is tapered toward the downstream side. Therefore, no turbulence occurs particularly in the stream line of the coating liquid, and the coating liquid can smoothly flow on the undercoating liquid. In addition, since the clear liquid extruding outlet 38A (FIG. 17) is positioned to be closer to the downstream side than the image forming liquid extruding outlet 36A, the clear liquid C can intervene between the image forming liquid I and the upper surface of the recording head 10C. Accordingly, even if the clear liquid C comes into contact with the upper surface of the recording head 10C to generate a delay, the delay of the image forming liquid I is small, and the image quality is further improved.

Since the dummy liquid S is continuously supplied to be adjoined to the front and rear ends of the image recording liquid L, the image recording liquid L and dummy liquid S are combined in the boundary and superposed on the undercoating liquid U as shown in FIG. 19. Moreover, the dummy liquid is connected to both edges of the image recording liquid L and superposed on the undercoating liquid U. Therefore, the image recording liquid L is applied with the front and rear edges and both sides held by the dummy liquid S, and the distortion of the front and rear edges and both sides of the image recording liquid L is prevented.

Additionally, the coat length and width of the undercoating liquid U is the same as or larger than the total length and width of the image forming area and surrounding dummy liquid coating areas, respectively.

Figure 20A:
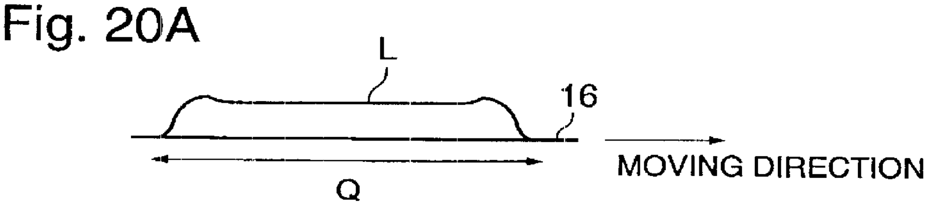
FIGS. 20A to 20C are sectional views of the coating state of the image recording liquid according to the eighth embodiment.
Figure 20B:
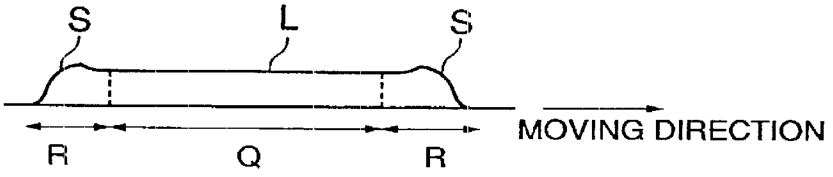
Figure 20C:
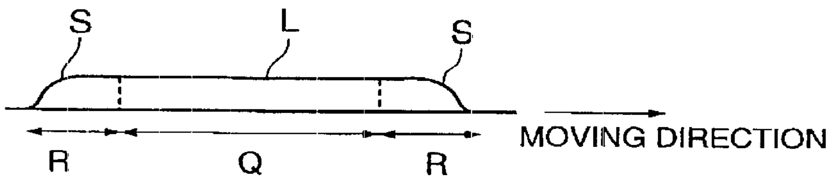

FIG. 20 shows the coating state in the moving direction of the image receiving medium 16 in sectional views. FIG. 20A shows that no dummy liquid S is applied, and as clearly seen from the figure, the image recording liquid L is raised by its surface tension on the front and rear edges of the image forming area Q, and image distortion is generated. FIGS. 20B, 20C show that the dummy liquid S is applied. In FIG. 20B, since the image recording liquid L continues to the dummy liquid S, the edge of the image recording liquid L fails to be distorted. The edge of the dummy liquid S is raised and distorted by the surface tension, but when the dummy liquid S is transparent, the distortion fails to influence the image quality. FIG. 20C shows that the surface tension of the image recording liquid L and dummy liquid S is small. In this case, the coat thickness of the dummy liquid S smoothly changes to be thinned toward the outside, but the coat thickness of the image recording liquid L is kept to be constant over the entire image forming area Q. This fails to deteriorate the image quality.

In the eighth embodiment, since one image forming liquid and one clear liquid are supplied to each coating liquid extruding port 12, the monochromatic image with a variable density is formed. However, by using and combining a plurality of image forming liquids having different colors (e.g., yellow, magenta, cyan, and black) to extrude from the common coating liquid extruding port, the colored image can be formed.

Ninth Embodiment

Figure 21:
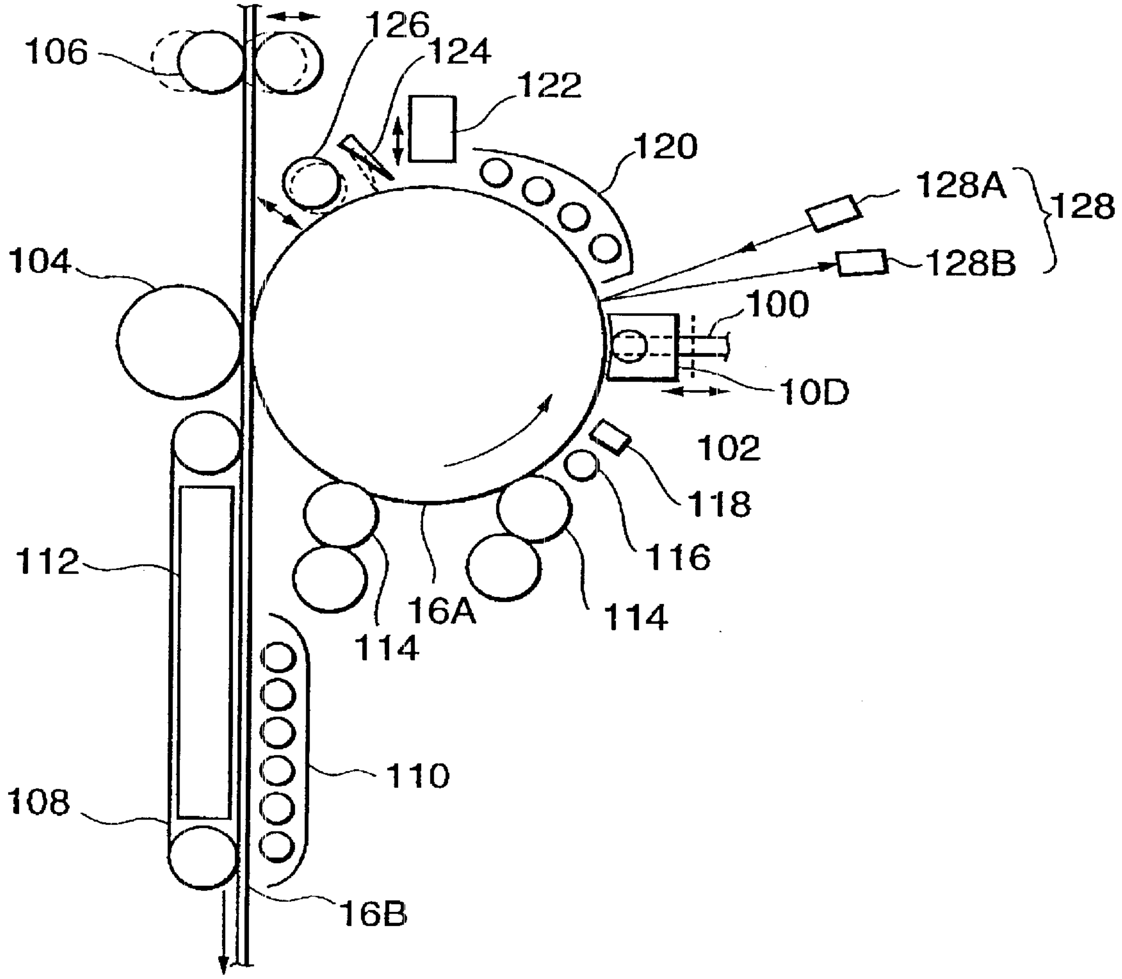
FIG. 21 is a schematic view of the image forming apparatus (coating apparatus) according to a ninth embodiment.
Figure 22:
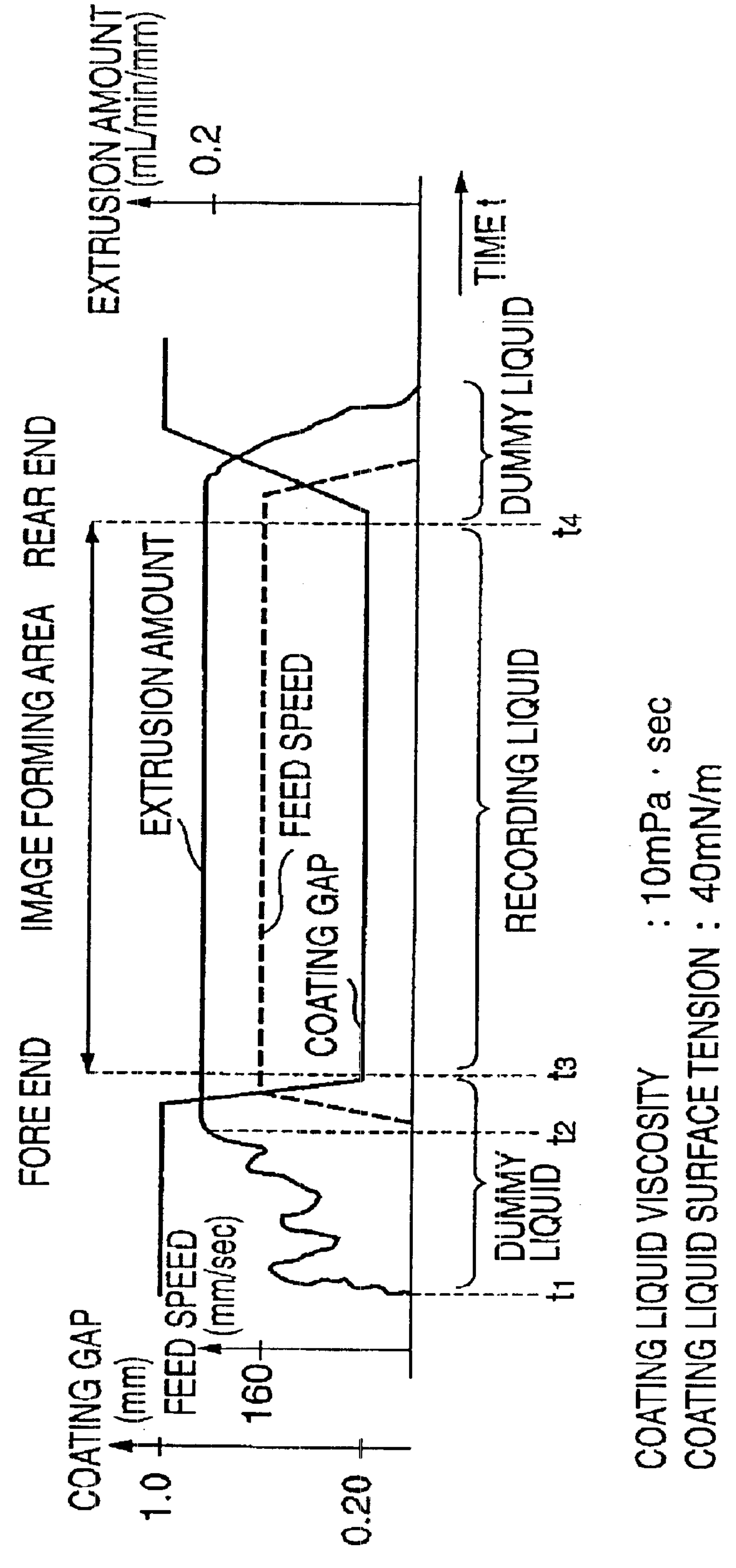
FIG. 22 is a chart showing an operation timing of the ninth embodiment.

FIG. 21 is an schematic view of a ninth embodiment of an image forming apparatus of the present invention, and FIG. 22 is a diagram showing an operation timing. The present embodiment employs the slot coating method similar to that of the embodiments shown in FIGS. 16 to 18, but it is different in that a recording head 10D forms the image on a final image receiving medium 16B through the intermediate image receiving medium 16A.

The intermediate image receiving medium 16A is a cylindrical drum and the recording head 10D supplies the image recording liquid L, dummy liquid S and undercoating liquid U to the right side periphery of this drum 16A. The image recording liquid L is a mixture of the image forming liquid and the clear liquid as described above. Since the recording head 10D is constituted as similar to those described with reference to FIGS. 16 to 20, like reference numerals denote the same part to avoid repeated description. The recording head 10D is held by a pair of guide posts 100 so that the head can be attached to or detached from the drum 16A. A pair of auxiliary rollers 102 (only one is shown) are disposed on the both right and left sides of the recording head 10D. When the recording head 10D approaches the drum 16A, the rollers 102 abut on both ends of the right side of the drum 16A in a rolling manner, thereby maintaining the gap between the recording head 10D and the drum 16A to be constant.

The image recording liquid L and dummy liquid extruded from the recording head 10D are loaded onto the drum 16A and carried upwards by counterclockwise rotation of the drum 16A. The final image receiving medium 16B such as a recording sheet is pushed by a pressure roller 104 against the left side periphery of the drum 16A to travel at the same speed. As a result, the coating liquid and undercoating liquid on the drum 16A are transferred to the recording sheet 16B. The recording sheet 16B is fed downwards in FIG. 21 at a constant speed by a guide roller 106 and a guide belt 108, and the coating liquid and undercoating liquid are dried by a heater 110 midway. 112 is a suction box, disposed in the guide belt 108, for sucking the recording sheet 16B on the upper surface of the guide belt 108 to carry the sheet 16B in close contact with the guide belt 108.

Moreover, two cleaning rollers 114, 114 contact with and roll the drum 16A to clean the surface of the drum 16A. 116 and 118 are a heater and an charged electrode which heat and charge the surface of the drum 16A to perform the surface treatment such that adhesion of the coating liquid (image recording liquid L and dummy liquid S) and undercoating liquid U to the rotary drum 16A is smoothed. 120 and 122 are a heater and a dry air blowing duct for preliminarily drying the coating liquid and undercoating liquid supplied from the recording head 10D.

Numeral 124 denotes a blade for collecting liquid, which can serve as a coating liquid recovery section. This blade 124 strips off and collects the liquid unnecessary for the image formation from the transfer drum 16A. Incidentally, since the coating state can be stabilized by constantly extruding the coating liquid and undercoating liquid from the recording head 10D, the image formation can be stabilized by constantly supplying the liquid while removing the unnecessary liquid by this blade 124.

However, in the ninth embodiment, the image recording liquid Starts to be applied after the extruding of the dummy liquid from the recording head 10D is stabilized. Therefore, the blade 124 mainly removes the dummy liquid. After the application of the dummy liquid is stabilized, the application is switched to that of the image recording liquid, and it is therefore unnecessary to remove the image recording liquid. Therefore, consumption amount of the recording liquid can be depressed. A sensor detects whether or not the extruding of the dummy liquid reaches its stabilized state. Specifically, the recording head 10D is provided with a bubble detection sensor 128 in the dummy liquid extruding port. When the sensor 128 detects no bubble continuously for a given time, it is judged that the extruding of the dummy liquid is stabilized.

The bubble detection sensor 128 can be constituted, for example, of a light source 128 for emitting laser light to the extrusion surface of the dummy liquid, and a photo-sensor 128B for detecting the surface of the extruded liquid. In this case, by monitoring a position in which a laser light reflection amount changes, it can be judged whether or not a bubble is included. Additionally, a cleaning roller 126 further cleans the surface of the drum 16B which has been cleaned by the blade 124.

An operation of the ninth embodiment will be described with reference to FIG. 22. With respect to an elapsed time t on the abscissa, FIG. 22 shows a coating gap (unit: mm), i.e. a gap between the recording head 10D and the rotary drum 16A; feed speed on an outer periphery of the drum 16A (peripheral speed, unit: mm/sec); and extrusion amount (unit: mL/min/mn) of the coating liquid (dummy liquid). Here, the viscosity of the coating liquid is set to 10 mpa·sec, and the surface tension of the coating liquid is 40 mN/m.

First in order to coat the fore end of the image forming area with the dummy liquid, the dummy liquid extrusion amount control pump 160 (see FIGS. 17, 18) is started. Since the coating liquid extruding port 112 usually contains the bubble during non-use, the extruding immediately after the start becomes unstable. In FIG. 22 time $t_1$ to $t_2$ shows a range in which the extruding of the dummy liquid is unstable. It is preferable to prevent such unstably extruded dummy liquid from being transferred to the drum 16A. Therefore, prior to the extruding of the dummy liquid, the recording head 10D is detached from the drum 16A. Specifically, the coating gap is set to about 1.0 mm. In this case, since no dummy liquid is transferred to the drum 16A, the drum 16A is stopped.

When the bubble detection sensor 128 detects no dummy liquid bubble at time $t_2$, and such state continues for a predetermined time, it is judged that the extruding of the dummy liquid is stabilized. Moreover, after starting (rotating) the drum 16A and allowing the recording head 10D to approach the drum 16A, the coating gap is set to about 0.2 mm. Then, the dummy liquid extruded from the coating liquid extruding port 112 (dual purpose extruding port 112A) is applied to the drum 16A. Since the dummy liquid extruded during unstable extruding adheres to the extruding port 112A, the attached and accumulated dummy liquid is transferred once to the drum 16A at the time when the recording head 10D approaches the drum 16A. Such dummy liquid is removed using the blade 124.

The stable dummy liquid is applied to the drum 16A, and after a predetermined time, the image recording liquid is extruded instead of the dummy liquid. This is shown at time $t_3$ in FIG. 22. By controlling the density and/or the color of the image recording liquid by the image signal, the liquid is transferred to the drum 16A. Subsequently, on the rear end of the image forming area, the extruding port 112 again extrudes the dummy liquid instead of the image recording liquid. This is shown at $t_4$ in FIG. 22.

After the dummy liquid is extruded for a predetermined time period from the time to, the recording head 10D is detached from the drum 16A to enlarge the coating gap. Therefore, no dummy liquid is transferred to the drum 16A. Subsequently, the movement (rotation) of the drum 16A is stopped, the extruding of the dummy liquid is stopped, and a series of recording operation ends.

Figure 23:
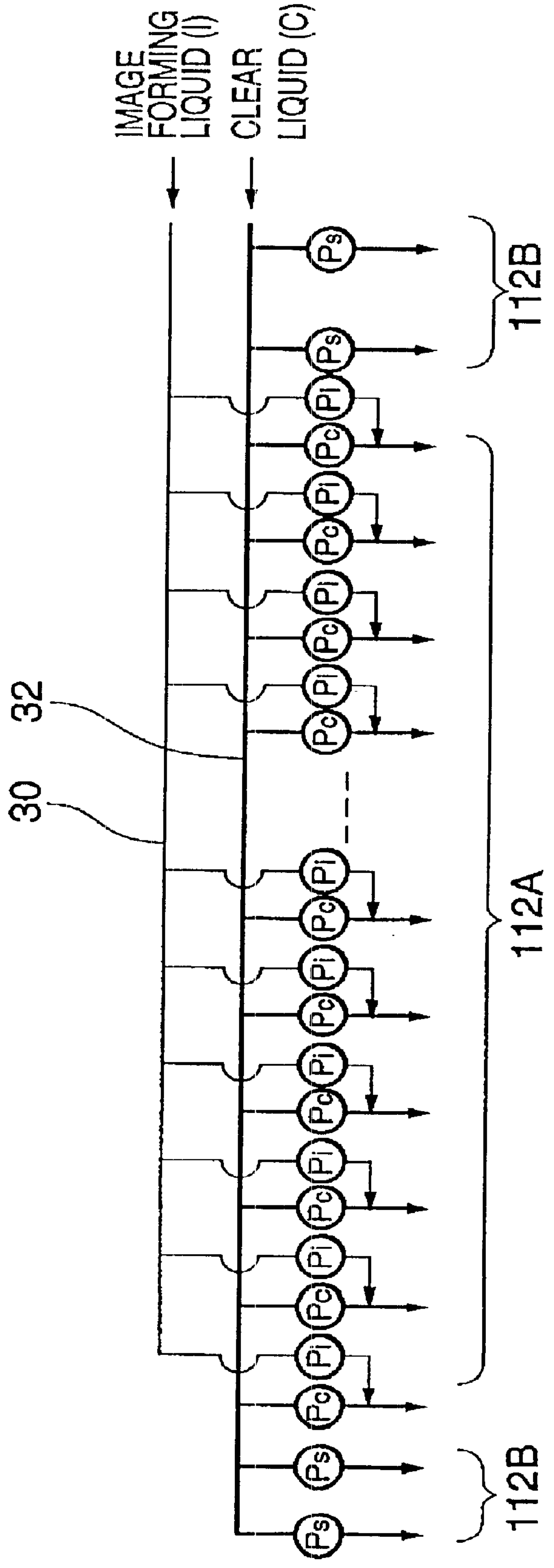
FIG. 23 is a flow path explanatory view when the clear liquid for use in the image recording liquid is utilized as the dummy liquid in the eighth, ninth embodiments.

Additionally, also in the eighth and ninth embodiments, the clear liquid for use in the image recording liquid can be utilized as the dummy liquid. As shown in the flow path explanatory view of FIG. 23, the clear liquid is supplied to both the dual purpose extruding port 112A and the dummy liquid extruding port 112B from the feed path 32, and used as the dummy liquid. In this case, since the liquid type for use is reduced, the handling of the apparatus is facilitated, and the recording head structure can be simplified.

As described above, according to the present invention, since the outside of the image forming width is coated with the dummy liquid for forming substantially no image, both edges of the image recording liquid are prevented from being raised or thickened on the image receiving medium or from spreading over in the width direction. Therefore, the image density is prevented from increasing or decreasing on the edge of the image, the stream line of the image recording liquid can be prevented from being distorted, and the image quality can be enhanced.

Moreover, in the present invention, since the dummy liquid for forming substantially no image is transferred to the fore end and/or the rear end of the image forming area, the front and/or rear edge of the image recording liquid is prevented from spreading on the image receiving medium, and the image can be prevented from being distorted on the front and rear edges. Therefore, the image quality can be enhanced.

The above has described as to the embodiments for forming an image. That is, description has been given as to two-dimensional drawing of an image on a sheet of paper or a film. However, the present invention can be used for production of a mosaic filter for use in an image display device such as a liquid crystal color display, i.e., a color filter in which color mosaics of yellow, magenta and cyan are repeatedly arranged. Further, the present invention can be also applied to manufacturing of an industrial product for forming a spatially repeated pattern.

What is claimed is:

1. An image forming method for forming an image on an image receiving medium with an image recording liquid, comprising steps of:

a) combining a plurality of recording liquids to form said image recording liquid, a mixing ratio of the plurality of recording liquids being varied based on an image signal;

b) extruding said image recording liquid from an image recording liquid extruding port to the image receiving medium as a continuous flow while the image receiving medium is moved relatively to the extruding port, so that said image recording liquid is continuously transferred to the image receiving medium to form the image; and c) extruding a dummy liquid for forming no image from a dummy liquid extruding port to the image receiving medium;

wherein to said image receiving medium, the image recording liquid is transferred in an image forming width, and a dummy liquid for forming no image is transferred to the outside of said image forming width.

2. The image forming method according to claim 1, wherein the image recording liquid transferred in the image forming width and the dummy liquid transferred to the outside of the image forming width are combined in a direction substantially perpendicular to a relative moving direction of the image receiving medium and are simultaneously transferred as the continuous flow to the image receiving medium.

3. The image forming method according to claim 1, wherein the image recording liquid and the dummy liquid have the same characteristics in at least one of surface tension and viscosity in the vicinity of a contact portion of both liquids.

4. The image forming method according to claim 1, wherein the image recording liquid and the dummy liquid have the same temperature at least when both liquids contact each other.

5. The image forming method according to claim 1, wherein the dummy liquid transferred to at least one outer side of the image forming width is extruded from a plurality of dummy liquid extruding ports arranged in a direction perpendicular to a relative moving direction of the image receiving medium.

6. The image forming method according to claim 1, wherein a volume flow rate per unit extruding width of the dummy liquid is set not to exceed the volume flow rate per unit extruding width of the image recording liquid.

7. The image forming method according to claim 1, wherein the dummy liquid transferred to at least one outer side of the image forming width has a volume flow rate gradually reduced toward outside of a width direction.

8. The image forming method according to claim 1, wherein the image recording liquid extruding port and the dummy liquid extruding port can be for a combined use, and the image recording liquid extruding port and the dummy liquid extruding port can extrude the image recording liquid or the dummy liquid in accordance with the image forming width.

9. The image forming method according to claim 1, wherein the dummy liquid contains no image forming substance.

10. The image forming method according to claim 1, wherein at least one recording liquid of said plurality of recording liquids is an image non-forming liquid for forming no image.

11. The image forming method according to claim 10, wherein the dummy liquid is the same as the image non-forming liquid.

12. The image forming method according to claim 1, wherein a density and/or a color of the image recording liquid is changed by varying the mixing proportion of the plurality of recording liquids while maintaining a constant volume flow rate of the image recording liquid.

13. An image forming apparatus for forming an image on an image receiving medium with an image recording liquid, comprising:

a recording head having an array of plural image recording liquid extruding ports and a dummy liquid extruding port, the array of the plural image recording liquid extruding ports being aligned in a direction perpendicular to a relative moving direction of the image receiving medium within an image forming width, the respective image recording liquid extruding ports extruding plural recording liquids and combining the plural recording liquids to form said image recording liquid, the image recording liquid being transferred to the image receiving medium as a continuous flow while the image receiving medium is moved relatively to the aligned plural image recording liquid extruding ports, the dummy liquid extruding port being disposed adjacent to the outside of the image forming width and extruding a dummy liquid;

image recording liquid extrusion amount control means for controlling supply amounts of the recording liquids fed to said respective image recording liquid extruding ports;

dummy liquid extrusion amount control means for controlling an extrusion amount of the dummy liquid extruded from the dummy liquid extruding port; and a controller for controlling said image recording liquid extrusion amount control means and said dummy liquid extrusion amount control means;

wherein said controller determines a mixing proportion of the plural recording liquids in the image recording liquid based on an image signal, and determines a supply amount and a supply timing of the respective recording liquids, and the determined supply amount and supply timing is fed to said image recording liquid extrusion amount control means;

wherein said controller determines a supply amount and supply timing of the dummy liquid extruded from the dummy liquid extruding port and the determined supply amount and supply timing of the dummy liquid is fed to said dummy liquid extrusion amount control means.

14. The image forming apparatus according to claim 13, wherein the image recording liquid extruding ports and the dummy liquid extruding port are continuously arranged in the direction perpendicular to the relative moving direction of is the image receiving medium.

15. The image forming apparatus according to claim 13, wherein a plurality of dummy liquid extruding ports are disposed on the recording head to oppose to at least one outer side of the image forming width.

16. The image forming apparatus according to claim 13, wherein some of said image recording liquid extruding ports can also be used as the dummy liquid extruding port, and the image recording liquid extruding ports adjacent to the outside of the image forming width in accordance with a change of the image forming width are used as the dummy liquid extruding ports.

17. The image forming apparatus according to claim 13, wherein said recording head has a slot-shaped opening arranged along a direction of the width of said image receiving medium, said slot-shaped opening connecting the image recording liquid extruding ports associated with the respective pixels and-the dummy liquid extruding port and combining the recording liquids extruded from the array of the plural image recording liquid extruding ports and the dummy liquid extruded from the dummy liquid extruding port to be zonally extruded in the width direction of the image receiving medium.

18. The image forming apparatus according to claim 13, wherein said recording head has a slot-shaped opening, formed independently from the image recording liquid extruding ports, for constantly extruding a predetermined amount of an undercoating liquid irrespective of the image signal in the zonated form which extends in the width direction of the image receiving medium.

19. The image forming apparatus according to claim 13, wherein the image receiving medium is a sheet-type final image receiving medium.

20. The image forming apparatus according to claim 13, wherein said image receiving medium is an intermediate image receiving medium for temporarily holding the image recording liquid supplied from the recording head and further transferring the image recording liquid to a final image receiving medium.

21. The image forming apparatus according to claim 13, wherein the image recording liquid extrusion amount control means is formed by a control valve disposed in a passage extending from a feed path for supplying the recording liquid to the respective recording liquid extruding ports.

22. The image forming apparatus according to claim 13, wherein the image recording liquid extrusion amount control means is formed by a pump whose extrusion amount is variable.

23. The image forming apparatus according to claim 13, wherein the dummy liquid extrusion amount control means is formed by a control valve disposed in a passage extending from a feed path for supplying the dummy liquid to the dummy liquid extruding port.

24. The image forming apparatus according to claim 13, wherein the dummy liquid extrusion amount control means is formed by a pump whose extrusion amount is variable.

25. The image forming apparatus according to claim 13, wherein said plural image recording liquid extruding ports are arranged in such a manner that the respective extruding ports corresponds to each of pixels aligned in the width direction of said image receiving medium.

26. An image forming method for forming an image on an image receiving medium with an image recording liquid, comprising steps of:

a) combining a plurality of recording liquids to form said image recording liquid, a mixing ratio of the plurality of recording liquids being varied based on an image signal;

b) extruding said image recording liquid from an image recording liquid extruding port to the image receiving medium as a continuous flow while the image receiving medium is moved relatively to the extruding port, so that said image recording liquid is continuously transferred to the image receiving medium to form the image; and c) extruding a dummy liquid for forming no image from a dummy liquid extruding port to the image receiving medium;

wherein said dummy liquid is transferred to said image receiving medium so that the transferred dummy liquid adjoins at least one of a front end and a rear end of an image forming area to which the image recording liquid is transferred.

27. The image forming method according to claim 26, wherein the dummy liquid is transferred to said image receiving medium so that the transferred dummy liquid adjoins to the front end of the image forming area.

28. The image forming method according to claim 27, wherein the transferring of the dummy liquid to the image receiving medium is restricted until the extruding from the dummy liquid extruding port is stabilized, and the dummy liquid is transferred to the image receiving medium after the extruding is stabilized.

29. The image forming method according to claim 28, wherein it is judged that the extruding of the dummy liquid from the dummy liquid extruding port is unstable when a bubble is detected in the dummy liquid in the vicinity of the dummy liquid extruding port detects.

30. The image forming method according to claim 28, is wherein the dummy liquid extruding port is detached from the image receiving medium to regulate the transferring of the dummy liquid to the image receiving medium until the extruding of the dummy liquid from the dummy liquid extruding port is stabilized; and the dummy liquid extruding port is allowed to approach the image receiving medium to permit the transferring of the dummy liquid to the image receiving medium after the extruding of the dummy liquid is stabilized.

31. The image forming method according to claim 28, wherein a coating liquid recovery section is disposed midway in a dummy liquid transfer path leading to the image receiving medium from the dummy liquid extruding port, and the coating liquid recovery section is operative when the extruding of the dummy liquid is unstable, and in operative after the extruding is stabilized.

32. The image forming method according to claim 26, wherein the dummy liquid is transferred to said image receiving medium to continue to the rear end of the image forming area.

33. The image forming method according to claim 32, wherein while the extruding from the dummy liquid extruding port is stable, the transferring of the dummy liquid to the image receiving medium is regulated to stop the transferring of the dummy liquid.

34. The image forming method according to claim 33, wherein while the extruding of the dummy liquid from the dummy liquid extruding port is stable, the dummy liquid extruding port is detached from the image receiving medium to regulate the transferring of the dummy liquid to the image receiving medium.

35. The image forming method according to claim 32, wherein a coating liquid recovery section is disposed midway in a dummy liquid transfer path leading to the image receiving medium from the dummy liquid extruding port, and the coating liquid recovery section starts operation while the extruding of the dummy liquid is stable.

36. The image forming method according to claim 26, further comprising a step of transferring the dummy liquid to the outside of a width direction of the image forming area.

37. The image forming method according to claim 26, wherein the image recording liquid to be transferred in the image forming area and the dummy liquid to be transferred to the outside of the image forming area are successively transferred to the image receiving medium as the continuous flow combined in a direction perpendicular to a relative moving direction of the image receiving medium, respectively.

38. The image forming method according to claim 26, wherein the image recording liquid and the dummy liquid, have the same characteristics in at least one of surface tension and viscosity in the vicinity of a contact portion of both liquids.

39. The image forming method according to claim 26, wherein the image recording liquid and the dummy liquid have the same temperature when both liquids contact each other.

40. The image forming method according to claim 26, wherein the dummy liquid is extruded from a plurality of dummy liquid extruding ports arranged in a direction perpendicular to a relative moving direction of the image receiving medium.

41. The image forming method according to claim 26, wherein a volume flow rate per unit transfer width of the dummy liquid is set not to exceed the volume flow rate per unit transfer width of the image recording liquid.

42. The image forming method according to claim 26, wherein the recording liquid extruding port and the dummy liquid extruding port can extrude the image recording liquid or the dummy liquid in accordance with the image forming area.

43. The image forming method according to claim 26, wherein the dummy liquid contains no image forming substance.

44. The image forming method according to claim 26, wherein at least one recording liquid among said plurality of recording liquids is an image non-forming liquid for forming no image after image formation.

45. The image forming method according to claim 44, wherein the dummy liquid is the same as the image non-forming liquid.

46. The image forming method according to claim 26, wherein a density and/or a color of the image recording liquid is changed by changing the mixing proportion of the plurality of recording liquids while maintaining a constant volume flow rate of the image recording liquid.

47. An image forming apparatus for forming an image on an image receiving medium with an image recording liquid comprising:

a recording head having an array of plural image recording liquid extruding ports and a dummy liquid extruding port, the array of the plural image recording liquid extruding ports being aligned in a direction perpendicular to a relative moving direction of the image receiving medium within an image forming width, the respective image recording liquid extruding ports extruding plural recording liquids and combining the plural recording liquids to form said image recording liquid, the image recording liquid being transferred to the image receiving medium as a continuous flow while the image receiving medium is moved relatively to the aligned plural image recording liquid extruding ports, the dummy liquid extruding port being disposed to cover the image forming width and extruding a dummy liquid;

image recording liquid extrusion amount control means for controlling supply amounts of the recording liquids fed to said respective image recording liquid extruding port;

dummy liquid extrusion amount control means for controlling an extrusion amount of the dummy liquid extruded from the dummy liquid extruding port; and a controller for controlling said image recording liquid extrusion amount control means and said dummy liquid extrusion amount control means;

wherein said controller determines a mixing proportion of the plural recording liquids in the image recording liquid based on an image signal, and determines a supply amount and a supply timing of the respective recording liquids and the determined supply amount and supply timing is fed to said image recording liquid extrusion amount control means;

wherein said controller determines a supply amount and supply timing of the dummy liquid extruded from the dummy liquid extruding port and the determined supply amount and supply timing of the dummy liquid is fed to said dummy liquid extrusion amount control means, so that the dummy liquid is transferred to at least one of a front end and a rear and of an image forming area to which the image recording is transferred.

48. The image forming apparatus according to claim 47, wherein the image recording liquid extruding ports and the dummy liquid extruding port are arranged in a direction perpendicular to a relative moving direction of the image receiving medium, respectively.

49. The image forming apparatus according to claim 48, wherein a plurality of dummy liquid extruding ports are disposed in a width which includes the image forming width and which is broader than the image forming width.

50. The image forming apparatus according to claim 48, wherein some of image recording liquid extruding ports can also be used as the dummy liquid extruding ports.

51. The image forming apparatus according to claim 47, wherein the recording head is held in such a manner that the recording head can be attached to or detached from the image receiving medium, and the recording head is controlled by said controller in such a manner that the recording head approaches the image receiving medium after the extruding of the dummy liquid transferred to the front end of the image forming area is stabilized and that the recording head is detached from the image receiving medium while the extruding of the dummy liquid transferred to the rear end of the image forming area is stable.

52. The image forming apparatus according to claim 47, further comprising a liquid recovery section disposed midway in a dummy liquid transfer path leading the image receiving medium from the dummy liquid extruding port, wherein the liquid recovery section operates to collect the dummy liquid at least when the extruding of the dummy liquid is unstable.

53. The image forming apparatus according to claim 47, wherein the image receiving medium is a sheet-type final image receiving medium.

54. The image forming apparatus according to claim 47, wherein said image receiving medium is an intermediate image receiving medium for temporarily holding the image recording liquid supplied from the recording head and further transferring the image recording liquid to a final image receiving medium.

55. The image forming apparatus according to claim 54, wherein the liquid recovery section is disposed in the intermediate image receiving medium.

56. The image forming apparatus according to claim 47, wherein the image recording liquid extrusion amount control means is formed by a control valve disposed in a passage extending from a feed path for supplying the recording liquid to the respective recording liquid extruding ports.

57. The image forming apparatus according to claim 47, wherein the image recording liquid extrusion amount control means is formed by a pump for changing a feed amount of the image recording liquid.

58. The image forming apparatus according to claim 47, wherein the dummy liquid extrusion amount control means is formed by a control valve disposed in a passage extending from a feed path for supplying the dummy liquid to the dummy liquid extruding port.

59. The image forming apparatus according to claim 47, wherein the dummy liquid extrusion amount control means is formed by a pump for changing a feed amount of the dummy liquid.

60. The image forming apparatus according to claim 47, further comprising a bubble detection sensor, disposed in the vicinity of the dummy liquid extruding port, for detecting whether or not the extruded dummy liquid contains a bubble.

* * * * *